United States Patent
Suri et al.

(10) Patent No.: US 6,298,403 B1
(45) Date of Patent: *Oct. 2, 2001

(54) HOST ADAPTER HAVING A SNAPSHOT MECHANISM

(75) Inventors: Salil Suri, Fremont; Taikhim Henry Tan, San Jose, both of CA (US)

(73) Assignee: Adaptec, Inc., Milpitas, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/089,030

(22) Filed: Jun. 2, 1998

(51) Int. Cl.$^7$ .................................................. G06F 13/00
(52) U.S. Cl. ............................................................ 710/100
(58) Field of Search ............................ 712/244; 710/260, 710/20, 21, 62, 129, 100

(56) References Cited

U.S. PATENT DOCUMENTS

| | | | |
|---|---|---|---|
| 3,789,365 | * 1/1974 | Jen et al. ............................... | 710/264 |
| 4,905,184 | 2/1990 | Giridhar et al. ....................... | 364/900 |
| 5,396,597 | 3/1995 | Bodin et al. .......................... | 395/275 |
| 5,657,273 | 8/1997 | Ayukawa et al. ................ | 365/189.01 |
| 5,659,690 | * 8/1997 | Stuber et al. .......................... | 710/129 |
| 5,732,223 | 3/1998 | Moore et al. .......................... | 395/250 |
| 5,828,475 | 10/1998 | Bennett et al. ....................... | 359/139 |
| 5,867,672 | 2/1999 | Wang et al. .......................... | 710/127 |
| 5,881,281 | 3/1999 | Gates et al. ............................... | 713/1 |
| 5,894,481 | 4/1999 | Book .................................... | 370/412 |
| 5,920,708 | 6/1999 | Gates et al. ............................ | 710/20 |
| 5,930,483 | 7/1999 | Cummings et al. .................. | 395/287 |
| 6,070,200 | 5/2000 | Gates et al. ............................ | 710/20 |

* cited by examiner

Primary Examiner—David Y. Eng
(74) Attorney, Agent, or Firm—Skjerven Morrill MacPherson LLP; Omkar K. Suryadevara

(57) ABSTRACT

A circuit collects data from a number of locations in a system memory of a personal computer, and can refetch the collected data at any time, e.g. when an adapter for transferring data between a computer bus and a peripheral bus that includes the circuit encounter an unexpected event (such as an error) in the transmission (or retransmission) of data to a first peripheral device. So the adapter simply flushes the data on encountering the unexpected event. Thereafter, the adapter switches context, to transfer data to a second peripheral device. At a later time, the circuit in the adapter refetches the flushed data, for retransmission of the data to the first peripheral device. To refetch the flushed data, the circuit does not traverse backwards through a scatter/gather data transfer pointer list (described above) that is used to collect the data from system memory. Instead, the circuit initially stores the values (collectively called "snapshot") of signals in various registers at the time of initial receipt of the data, and at a later time loads the saved snapshot to refetch data that was flushed.

10 Claims, 5 Drawing Sheets

Microfiche Appendix Included
(5 Microfiche, 132 Pages)

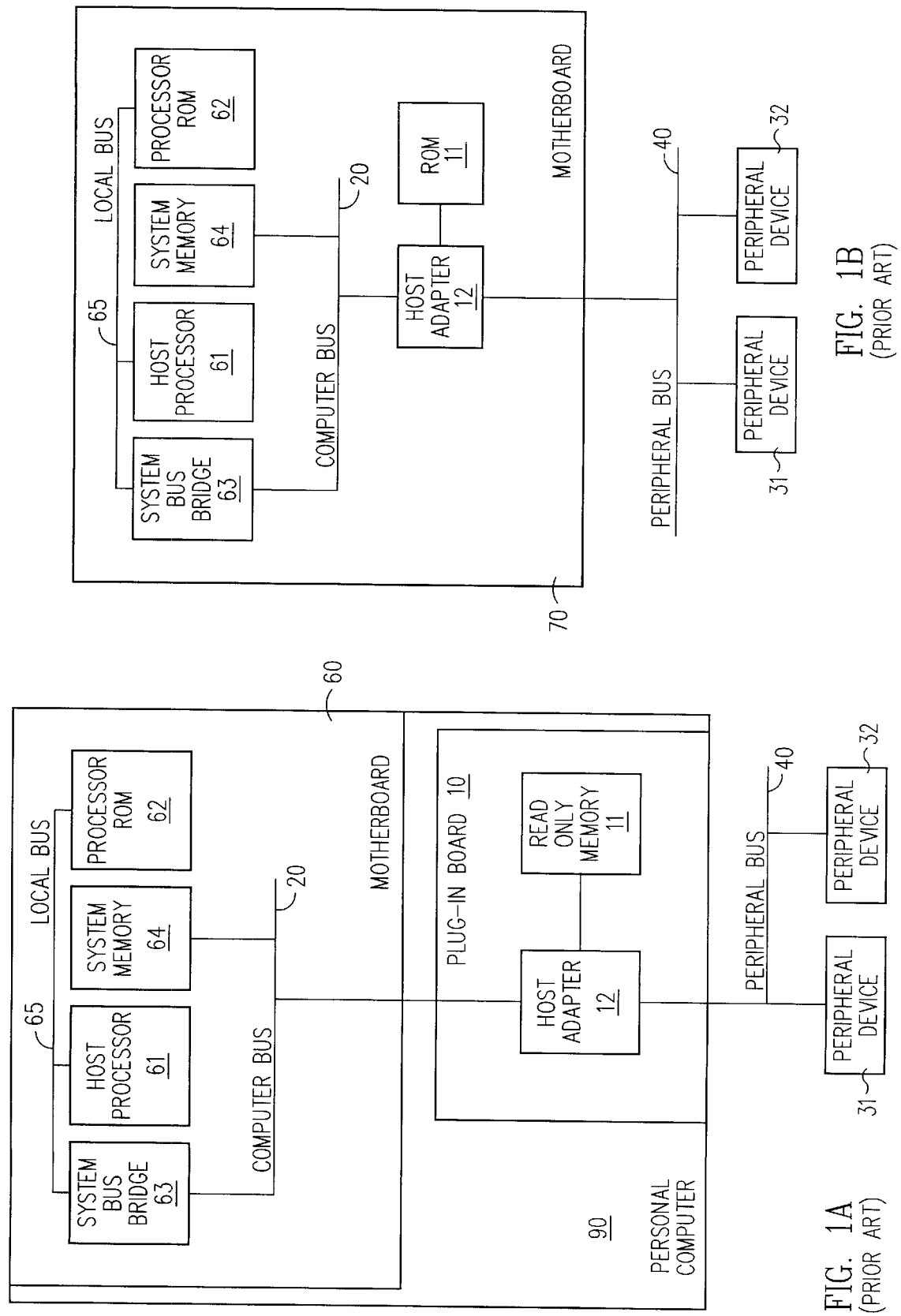

US 6,298,403 B1

HOST ADAPTER HAVING A SNAPSHOT MECHANISM

CROSS-REFERENCE TO RELATED APPLICATIONS

This application is related to and incorporates by reference herein in their entirety, the following commonly owned U.S. Patents:

(1) U.S. Pat. No. 6,240,482, entitled "Multiple Access Memory Architecture" by Stillman F. Gates and Uday N. Devanagundy;

(2) U.S. Pat. No. 6,148,384, entitled "Decoupled Serial Memory Access with Passkey Protected Memory Areas" by Uday N. Devanagundy, et al.;

(3) U.S. Pat. No. 6,070,200, entitled "A Host Adapter Having Paged Payload Buffers For Simultaneously Transferring Data Between A Computer Bus And A Peripheral Bus" by Stillman F. Gates et al.;

(4) U.S. Pat. No. 6,157,971, entitled "Source-Destination Re-Timed Cooperative Communication Bus" by Stillman F. Gates;

(5) Ser. No. 09/321,329, entitled "Fast Stack Save and Restore System and Method" by Stillman F. Gates;

(6) U.S. Pat. No. 6,065,066, entitled "Data Stream Packer And Unpacker Integrated Circuit" by Taikhim Henry Tan; and (7) U.S. Pat. No. 6,202,105, entitled "A Host Adapter Capable of Simultaneously Transferring Data of Multiple Contexts Between A Computer Bus And A Peripheral Bus" by Stillman F. Gates et al.

CROSS-REFERENCE TO THE ATTACHED APPENDICES A–C

Appendices A and B, which are part of the present disclosure, are included in a microfiche appendix consisting of 5 sheets of microfiche having a total of 329 frames, and the microfiche appendix is incorporated herein by reference in its entirety. Microfiche Appendix A is a listing of computer programs and related data including source code in the language VERILOG for implementing a "send payload buffer and manager" for use with one embodiment of this invention as described more completely below. Note that frame labeled A264 is intentionally left blank. Microfiche Appendix B is a listing of documentation for the computer programs of Microfiche Appendix A. Appendix C is a paper appendix that is included herein as pages 21–30. Appendix C is a listing of additional computer programs and related data similar to Appendix A.

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The present invention is related generally to a circuit in a personal computer or in a peripheral device for collecting data scattered in a number of locations in a system memory of the personal computer via a first bus (also called "computer bus"), and in particular to such a circuit for refetching of the collected data after flushing of the collected data during an initial transmission on a second bus (also called "peripheral bus") to which are coupled a number of peripheral devices.

2. Description of the Related Art

A personal computer 90 (FIG. 1A) includes a plug-in board 10 that is coupled to two buses namely (1) a computer bus (such as the ISA/EISA bus well known in the art) 20 on a mother board 60 and (2) a peripheral bus (e.g. SCSI bus also well known in the art) 40. Peripheral bus 40 is, in turn, connected to one or more peripheral devices, e.g. devices 31 and 32. Similarly, computer bus 20 is coupled to one or more devices on board 60, such as system memory 64, and to a local bus 65 that in turn is coupled to a host processor 61 (e.g. the microprocessor PENTIUM available from Intel Corporation, Santa Clara, Calif.). Local bus 65 is also coupled to a read only memory (also called "processor ROM") 62 that holds software, e.g. Basic Input-Output System (BIOS) instructions to be executed by processor 61 on power up. Moreover, plug-in board 10 also includes a read only memory 11 that is programmed with instructions to be executed by host adapter 12 on power up. Instead of being mounted on a separate board 10, host adapter 12 and read only memory 11 can be mounted directly on a mother board 70 (FIG. 1B).

Peripheral bus 40 may conform to the specification of the Small Computer System Interface (SCSI) standard avail able from the American National Standards Institute (ANSI x3.131-1986) of 1430 Broadway, New York, N.Y. 10018. The just-described SCSI standard specification is incorporated by reference herein in its entirety. Additional descriptions related to the SCSI bus may be found in, for example, U.S. Pat. Nos. 4,864,291 and 4,905,184 that are both incorporated by reference herein in their entirety.

Computer bus 20 may conform to any of the computer bus standards, such as the Industry Standard Architecture (ISA), Extended ISA (EISA), or Peripheral Component Interconnect (PCI). The PCI specification is available from PCI Special Interest Group (SIG), M/S HF3-15A, 5200 NE Elam Young Parkway, Hillsborough, Oreg. 97124-6497, phone number 503/696-2000, and is incorporated by reference herein in its entirety. Additional descriptions related to the PCI bus can be found in the book "PCI System Architecture", Second Edition, by Tom Shanley and Don Anderson, MindShare Press, Richardson, Tex., 1994 also incorporated by reference herein in its entirety.

Computer bus 20 is typically faster than peripheral bus 40, and therefore a conventional host adapter 12 (as described in, for example, U.S. Pat. No. 5,659,690 by Stuber et al that is incorporated by reference herein in its entirety) has FIFO buffers to store data temporarily during passage between peripheral bus 40, and computer bus 20. Host adapter 12 can transfer the data between peripheral device 31 and system memory 64, without intervention of host processor 61, in a mechanism known as "Direct Memory Access" (DMA), as described by Stuber et al at column 90, line 38 et seq.

The data transfer described above can be initiated by transferring to host adapter 12 a command in the form of a "Sequencer Control Block" (SCB) that contains information needed by host adapter 12 to perform the data transfer, as described by Stuber et al. at column 17, line 66 et. seq. Moreover, host adapter 12 can transfer the data to/from system memory 64 via a scatter/gather mechanism that stores the data in a number of portions in system memory 64. The SCB includes "a pointer to a scatter/gather data transfer pointer list, [and] a count of the number of elements in the scatter/gather list" (column 18, lines 3–5) that together indicate the portions of system memory 64 (FIG. 1A) to or from which the data is to be transferred.

Host adapter 12 typically has more than one SCSI command pending in a queue of SCBs as described by Stuber et al. at column 20, line 1 et seq. In one example, SCBs for each of two peripheral devices 31 and 32 are queued, and when a first peripheral device 31 disconnects from host adapter 12 (e.g. while the drive mechanics are repositioned) host adapter 12 communicates with a second peripheral device 32 to execute an SCSI command indicated by the another SCB. The ability of host adapter 12 to switch back and forth between SCBs, is referred to as "context switching" (Stuber et al., column 20, line 9).

A context switch (e.g. when a data transfer is suspended or is completed) is not performed if host adapter 12 encounters an unexpected event (such as an error) during transmission of data that was prefetched. When host adapter 12 encounters an error, host adapter 12 may suspend the data transfer to allow peripheral bus 40 to be used by others. At this time, host adapter 12 holds data in the above-described FIFO buffer that was prefetched. Until the FIFO buffer is emptied, e.g. by transmission of the prefetched data, host adapter 12 cannot use peripheral bus 40 for another data transfer (using another SCB). To recover from an error, host adapter 12 maintains the data in the FIFO buffer and tries (e.g. periodically) to retransmit the prefetched data, until the data is successfully transferred or is flushed. Host adapter 12 flushes the data when a device on peripheral bus 40 indicates that the device is sending data that must be placed in the FIFO buffer. When host adapter 12 flushes the data, adapter 12 returns an error status for the command being executed by the data transfer, so that the software driver in memory 64 later re-issues the command to adapter 12.

SUMMARY OF THE INVENTION

In accordance with the invention, a circuit collects data from a number of locations in a system memory of a personal computer, for example for transmission of the collected data to a peripheral device coupled to the personal computer. The circuit can refetch the collected data at any time, e.g. when an adapter for transferring data between a computer bus and a peripheral bus that includes the circuit encounter an unexpected event (such as an error) in the transmission (or retransmission) of data to a first peripheral device. So, instead of holding the data and retransmitting the data as discussed above, the adapter simply flushes the data. Thereafter, the adapter switches context, to transfer data to a second peripheral device. At a later time, the circuit in the adapter refetches the flushed data, for retransmission of the data to the first peripheral device.

To refetch the flushed data, the circuit (also called host interface module) does not traverse backwards through a scatter/gather data transfer pointer list (described above) that is used to collect the data from system memory. Instead, the circuit initially stores the values (collectively called "snapshot") of signals in various registers at the time of initial receipt of the data. Specifically, in one embodiment, the circuit routinely saves, in a memory (hereinafter "restart memory"), a value derived from a scatter-gather element the value (also called scatter-gather recovery snapshot) identifying the data at the beginning of each block of data (also called "payload") to be transferred. In one implementation, the payload is temporarily stored in one or more buffers (formed by various portions of memory) of fixed size, called "pages," although in another implementation, such a payload is stored in buffers of variable size, called "segments."

When an unexpected event happens, the adapter copies the saved scatter-gather element into a memory (such as an off-chip memory) that contains other scatter-gather elements for other contexts (e.g. other peripheral devices). When a snapshot is copied from the restart memory, the memory portions that held the snapshot become available for use in holding another snapshot. At some later time (e.g. after transferring data for the other contexts), the adapter refetches the flushed data from the system memory by loading the saved snapshot into the corresponding registers and using the registers in the normal manner. Therefore, in a critical aspect of the invention, a host interface module in the adapter stores the just-discussed scatter-gather recovery snapshot ahead of time, in the restart memory, in anticipation of a possible need for the adapter to refetch the data. Such refetching of flushed data eliminates the need for the reporting of error status and the re-issue of a command (for which the data was flushed) as required by the prior art (as described above).

In one embodiment, the adapter includes a circuit (hereinafter "send data path") that transfers the data from the computer bus to the peripheral bus. The send data path includes a storage circuit (hereinafter "send payload buffer and manager," abbreviated as "SPB") that receives data from the computer bus, and when enough data has been received to form a payload of a predetermined size, a control circuit (hereinafter "send frame control," abbreviated as "SFC") prepares the header of a message (such as a "frame" of the Fibre Channel protocol) containing the payload to be transmitted on the peripheral bus. The storage circuit includes a buffer (formed of storage elements) of the type described above for temporarily holding the data being transferred. The buffer is organized into a number of fixed-sized pages that are accessible for data storage only one page at a time.

In this embodiment, the adapter includes a number of storage elements (called "restart memory" as noted above) that hold one or more snapshots for use in refetching data that is being held in a corresponding number of one or more pages (described above) for transmission by the control circuit in messages on the peripheral bus. Each snapshot contains at least a value derived from a scatter gather element e.g. an address and a count, or an updated address and count. The address points to a location in system memory that contains the first word of data currently being held in the adapter. A snapshot may also include one or more additional pointers to locations in system memory (such as a pointer to a scatter/gather data transfer pointer list, and a pointer to the just-described scatter gather element) for use in refetching the data in the corresponding page (e.g. for use in fetching the next scatter gather element).

An adapter as described herein can switch context several times and encounter any number of errors and not become stalled (e.g. by trying to retransmit to recover from the error) if at least one peripheral device is communicating. So, even when several peripheral devices are simultaneously encountering errors, an adapter as described herein communicates with one or more communicating peripheral devices. Therefore, an adapter as described herein transmits data even on encountering one or more errors, as compared to a prior art host adapter that becomes "stalled" by trying to retransmit data to the same peripheral device after encountering a single error.

BRIEF DESCRIPTION OF THE DRAWINGS

FIGS. 1A and 1B illustrate two variants of a prior art personal computer having a host adapter for transferring data between a peripheral bus external to the personal computer, and a computer bus located inside the personal computer and coupled to various components contained therein (such as a processor, and a system memory).

DETAILED DESCRIPTION

Figure 2A:
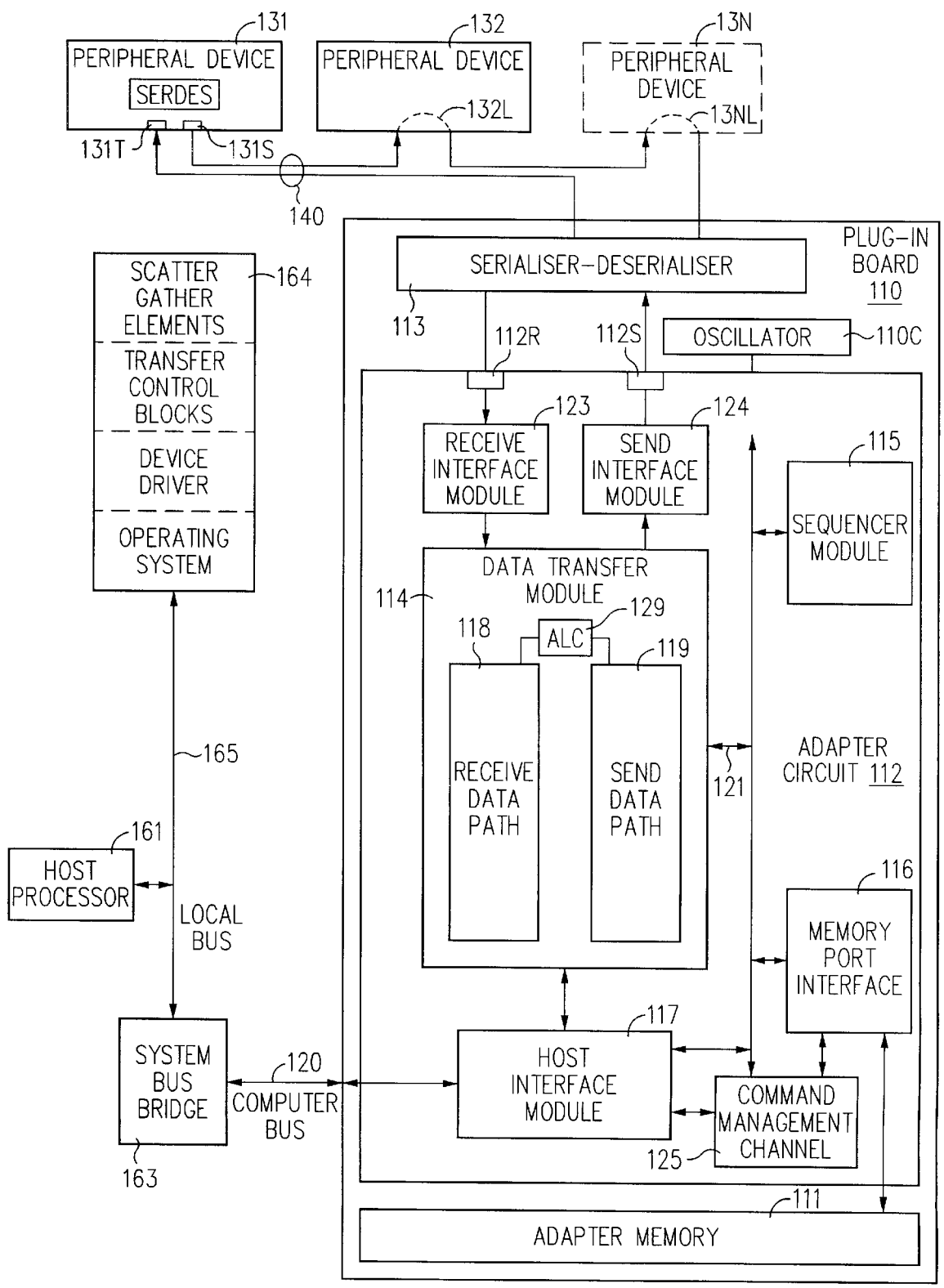
FIGS. 2A and 2B illustrate, in a high level block diagram and an intermediate level block diagram respectively, a adapter circuit in one embodiment of this invention.

In one embodiment of the invention, an adapter circuit 112 (FIG. 2A) couples a peripheral bus 140 (such as a bus in conformance with the SCSI protocol of the type described above, or a Fibre Channel protocol as described by the X3T11 standards of committee of ANSI, see the documentation available from the Internet at http://www.fcloop.org/technology/ faqs/fc_faq_4.htm, and http://www.1.cern.ch/HSI/fcs/spec/overview.htm) to a computer bus 120 (such as a bus in conformance with the PCI protocol described above). Specifically, adapter circuit 112 receives data from a computer bus 120 and transmits the received data to peripheral bus 140 in a number of messages (such as "frames" of the Fibre Channel protocol), each message having a header and a block of data (also called "payload").

Adapter circuit 112 temporarily stores, if necessary, the payload of a message passing therethrough, in one or more fixed-size pages of the type described in the related U.S. Pat. Nos. 6,070,200 and 6,202,105 that were incorporated by reference above. Prior to any data transfer, each of two devices between which data is to be transferred communicate the maximum possible size of data to be transferred therebetween, in a payload. For example, adapter circuit 112 may transmit on peripheral bus 140 an "open" message indicating that the largest payload that can be transferred is 2K bytes, and peripheral device 131 responds with the size of an internal buffer, e.g. 512 bytes. Depending on the size of a buffer in a peripheral device 131, a size of a payload agreed to by both devices can be larger than, smaller than, or equal to the size of a single page. If the agreed-to payload size (e.g. 2Kbytes) is larger than the size (e.g. 512 bytes) of a single page, multiple pages (e.g. 4 pages) are used to store a single payload. If the agreed-to payload size is smaller than a single page size, only one payload is stored in every page (e.g. when the page size is 512 bytes, only one payload is stored in each page even if the payload size is just 128 bytes, i.e. 384 bytes of each page remain unused).

Adapter circuit 112 transfers data between buses 120 and 140 to allow a number of peripheral devices (e.g. peripheral devices 131, 132, . . . 13N in FIG. 2A) to communicate with a host processor 161, one at a time. Specifically, in one specific implementation, bus 140 forms a loop that couples various devices 131, 132 and 13N and adapter circuit 112 each to the other, wherein only two devices that are communicating have no connection between a send terminal and a receive terminal (e.g. send terminal 131S is uncoupled from receive terminal 131T in device 131, and send terminal 112S is uncoupled from receive terminal 112R in adapter circuit 112). The other devices 132 and 13N coupled to peripheral bus 140 have links 132L and 132N that couple the respective send and receive terminals (not shown). In one implementation, each terminal (e.g. receive terminal 112R) includes two pins, for a pair of differential signals that are transmitted over a twisted pair of wires.

Figure 2B:
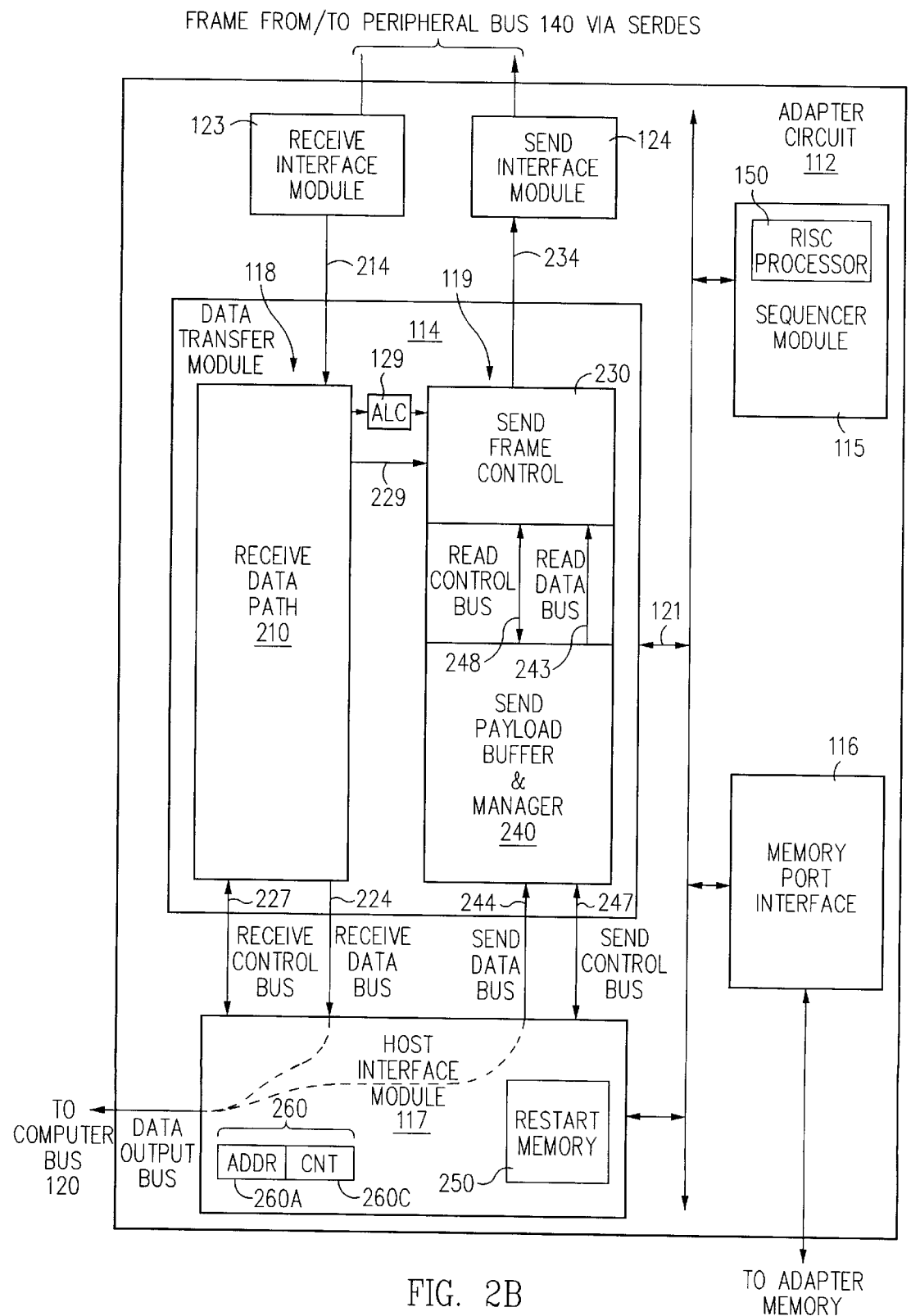

The coupling between a send terminal (e.g. terminal 112S in FIG. 2A) and a receive terminal (e.g. terminal 112R) is implemented by a circuit (hereinafter "arbitrated loop control", abbreviated as "ALC") 129 (FIG. 2B) that monitors the signals on bus 140 for a message having as the destination the device (e.g. adapter circuit 112) containing the two terminals. When adapter circuit 112 is not a master, ALC 129 functions in a loop back mode by retransmitting on send terminal 112S (FIG. 2A) all messages received on receive terminal 112R receives, until receiving a message (also called "open message") having a predetermined pattern (as defined in an "arbitration loop protocol" in the Fibre Channel specification). On receipt of such an open message, ALC 129 opens the coupling between terminals 112R and 112S, so that all messages received thereafter are transferred to receive data path 118, and send data path 119 starts transmitting messages on terminal 112S (e.g. idle messages). When data transmission between two devices is completed, both devices release peripheral bus 140, e.g. by coupling of the respective receive and send terminals by the respective ALCs. Note that the respective ALCs (e.g. ALC 129 in adapter circuit 112) can be disabled, e.g. when peripheral bus 140 connects only two devices each to the other, in a point-to-point connection.

Host processor 161 executes software in the form of a device driver that is programmed into a system memory 164 (FIG. 2A) to transfer data to and from peripherals 131 and 132 via adapter circuit 112. The device driver provides instructions for the data transfer to adapter circuit 112 in the form of a number of transfer control blocks (TCBs) that are similar or identical to the Sequencer Control Blocks described above. System memory 164 also includes a list of scatter gather elements that identify the locations in system memory 164 to/from which data is transferred by adapter circuit 112, as described in, for example, U.S. Pat. No. 5,659,690 by Stuber et al that was incorporated by reference above. Various portions of adapter circuit 112 that are not described herein may be implemented in a manner similar or identical to that described in, U.S. Pat. No. 5,659,690.

Adapter circuit 112 of this embodiment also includes a memory port interface 116 (FIG. 2A) that provides an interface to adapter memory 111 as described in the U.S. Pat. No. 6,240,482 incorporated by reference above. The data held in adapter memory 111 is used by adapter circuit 112 to initialize various storage elements contained in adapter circuit 112, e.g. to initialize a device identifier used in transferring data as described in U.S. Pat. No. 6,148,384 that was incorporated by reference above.

Adapter circuit 112 includes a data transfer module 114 (FIG. 2A) that couples each of receive interface module 123 and send interface module 124 to host interface module 117. Data transfer module 114 includes a receive data path 118 for processing data received in one or more messages from peripheral bus 140 (via serializer-deserializer 113 and receive interface module 123), and transmission of the data to host interface module 117. Data transfer module 114 also includes a send data path 119 for processing data prefetched from system memory 164 by host interface module 117. Send data path 119 transmits the prefetched data in one or more messages onto peripheral bus 140 (via send interface module 124 and serializer-deserializer 113). Host interface module 114 accesses system memory 164 via computer bus 120 at addresses defined in the scatter gather data transfer pointer list as discussed below.

Adapter circuit 112 also includes a sequencer module 115 that controls and coordinates the transfer of data between computer bus 120 and peripheral bus 140. Sequencer module 115 is implemented by storage elements (not shown) and a RISC processor 150 (FIG. 2B) that is programmed with instructions to implement a multi-tasking protocol engine of the type described in the above referenced U.S. Pat. No. 5,659,690, except that sequencer module 115 performs actions of the type described herein. For example, sequencer module 115 copies a snapshot from restart memory 250 (FIG. 2B) into adapter memory 111 (FIG. 2A) in response to a control circuit (e.g. SFC 230 in FIG. 2B) encountering a problem in transmission of prefetched data. Specifically, sequencer module 115 overwrites a previously stored scatter-gather element in a transfer control block (TCB) in adapter memory 111 with the scatter-gather element from which data needs to be refetched at a later time.

Sequencer module 115 communicates with various modules, e.g. host interface module 117 and send data path 119 via an internal bus (sometimes called "CIOBUS") 121, as described in U.S. Pat. No. 6,157,971 by Stillman F. Gates. For example, sequencer module 115 may drive a signal active to host interface module 117 (e.g. by writing into a register 271 in module 117; see FIG. 3) to refetch data that was previously flushed by send data path 119. As another example, sequencer module 115 may copy the values held in restart memory 250 into another memory (such as adapter memory 111 in FIG. 2A) in case of a context switch of the type described in U.S. Pat. Nos. 6,070,200 and 6,202,105 that were incorporated by reference above.

The scatter gather data transfer pointer list (that is held in system memory 164) includes a number (e.g. 2 or 20,000) of elements (also called "scatter gather" elements) that identify various locations in system memory 164, and the corresponding amounts of data to be transferred from the locations. Sequencer module 115 accesses the scatter gather data transfer pointer list by programming the address of the list into a register (not shown) in command management channel 125. Thereafter, command management channel 125 obtains a portion (e.g. 128 bytes) of the list from memory 164 as discussed in U.S. Pat. No. 6,085,278 and U.S. patent application Ser. No. 09/321,329 that were both incorporated by reference above. In one implementation, channel 125 fetches from memory 164 a 128 byte sized portion of the list containing 16 elements (8 bytes per element with 4 byte addressing of memory 164) or 8 elements(16 bytes per element with 8 byte addressing). Thereafter, sequencer module 115 transfers the portion from command management channel 125 to a cache of scatter-gather elements in adapter memory 111, and uses each scatter-gather element one at a time to program a pair of storage elements 260 (see FIG. 2B) that are used as discussed below.

Host interface module 117 transfers data from system memory 164 to send data path 119 using a first storage element (hereinafter "address register") 260A that holds an address indicative of a location in system memory 164 (FIG. 2A) from where data is to be transferred, and a second storage element (hereinafter "count register") 260C that holds a count indicative of the amount of data to be transferred. The value in storage element 260C is decremented and the value in storage element 260A is incremented by amount of data transferred from alignment circuit 292 to packer 291, e.g. by 8 bytes in response to a count enable signal that goes active when the 8 bytes for a line are transferred (and also when fewer bytes are transferred for a line at the end of a payload). In addition, host interface module 117 also includes a restart memory 250 (FIG. 2B) that holds a snapshot of the values in storage elements 260, wherein the values were present when data for a payload is first fetched from computer bus 120. In addition to the values of storage elements 260, a snapshot may include any other related pointers for use in the event of a need for host interface module 117 to refetch the data (e.g. when send data path 119 encounters a data transfer stall due to non-receipt of an r-ready message or encounters an error on peripheral bus 140, and flushes any untransferred data). Flushing of the data as described herein frees up memory that is used to temporarily hold the data as described below.

Send data path 119 (FIG. 2B) includes a storage circuit (hereinafter "send payload buffer and manager", abbreviated as "SPB") 240 that contains a first-in-first-out memory 241 (also called "buffer") organized into a number of pages as described above, and used to temporarily hold the data being prefetched by host interface module 117 from system memory 164 (via computer bus 120). SPB 240 has a first data bus (hereinafter "send data bus") 244 and a first control bus (hereinafter "send control bus") 247 that are both coupled to host interface module 117. SPB 240 is also coupled to internal bus 121 to allow sequencer module 115 to (1) write data into a page to be transmitted in a payload (e.g. to indicate the maximum available buffer size in an "open" message) and (2) read or write control and status information into various registers in SPB 240. Host interface module 117 drives a first control signal (hereinafter "send enable signal") active to indicate that module 117 is passing data from computer bus 120 to send data bus 244 on every rising edge of the clock cycle. In response to the active send enable signal, SPB 240 begins to store data from send data bus 244, and continues to store data on each clock cycle for as long as the send enable signal remains active. SPB 240 stops storing data from bus 244 when the send enable signal becomes inactive.

In addition to SPB 240, send data path 119 (FIG. 2B) includes a control circuit (hereinafter "send frame control") 230 that creates a message using the data from one or more portions of memory in SPB 240 to form a payload and transmits the message (including the payload and a header formed from information in a TCB provided by sequencer module 115) on peripheral bus 140. SFC 230 has an output bus (hereinafter "message output bus") 234 (FIG. 2B) that is coupled (via send interface module 124) to peripheral bus 140, for transmission of messages thereto. SFC 230 also has a second data bus (hereinafter "read data bus") 243 and a second control bus (hereinafter "read control bus") 248 that are both coupled to SPB 240. SPB 240 drives (as discussed below) a second control signal (hereinafter "payload ready signal") active on read control bus 248 to indicate that a payload is available to be read onto read data bus 243.

Figure 3:
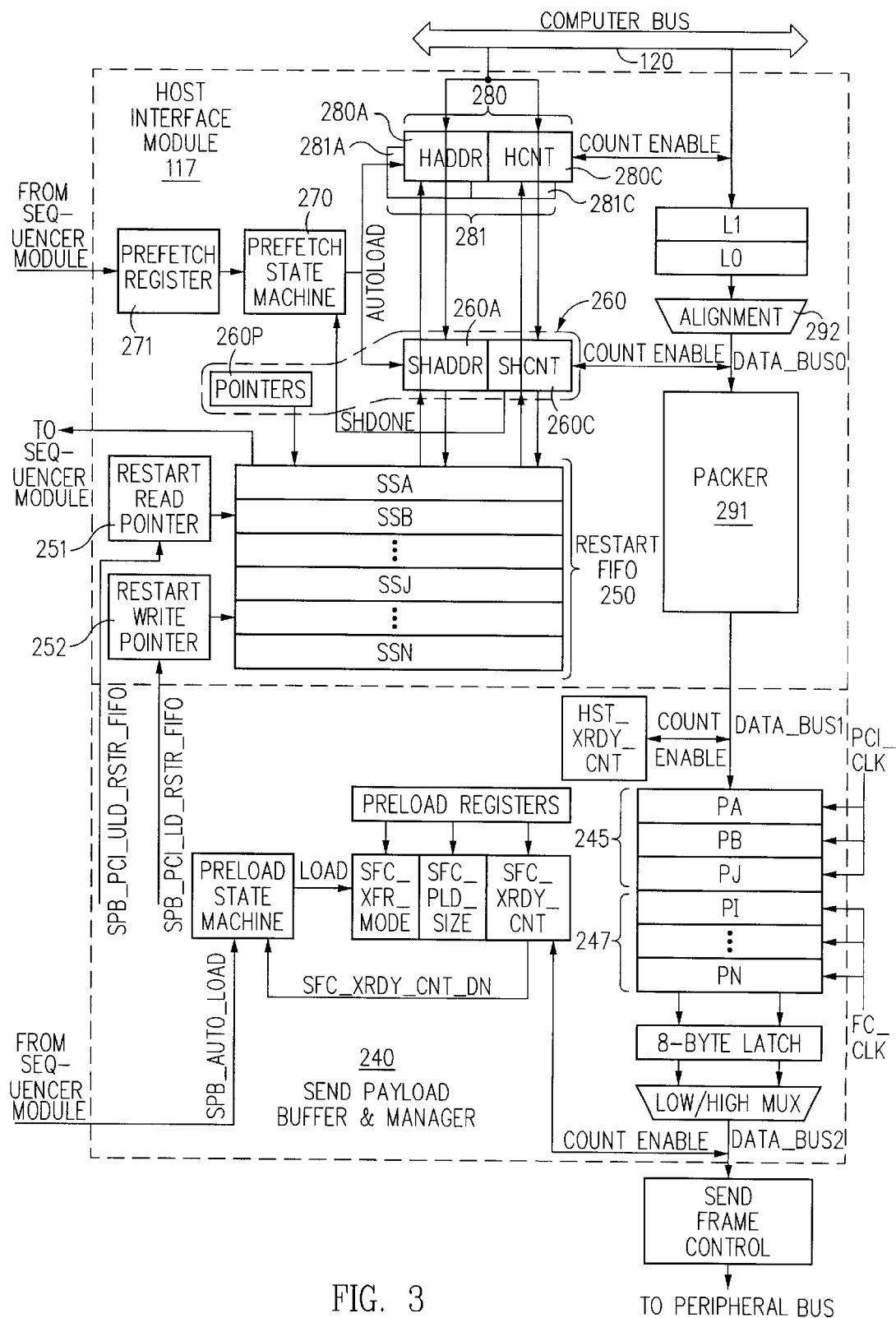
FIG. 3 illustrates, in a low level block diagram, various components included in a host interface module and in a send payload buffer and manager illustrated in FIG. 2B.

In one implementation, the above-described portions of memory in SPB 240 all have the same size, and are called "pages", as illustrated in FIG. 3 by pages PA–PN (wherein $A \geq I \geq N$, N being the total number of pages). Each page PI is either used to temporarily hold the data to be transferred to peripheral bus 140, or is empty. Each page PI includes a number of lines (e.g. 64 lines, each line having 8 bytes in a 512 byte page), and SPB 240 writes data from packer 291 one line at a time. Each page PI includes, associated with each line (not shown) a first single bit storage element (also called "end-of-payload" bit) and a second single bit storage element (also called "end-of-context" bit). When the number of bytes required for a payload (as indicated by signal SFC_PLD_SIZE in register 242) are stored in a page PJ, SPB 240 sets the end-of-payload bit for later use in transmission of the payload.

Empty pages (e.g. pages PA–PJ) are available for use in holding data being received from computer bus 120, and are operated at a first clock rate that is different from a second clock rate at which pages containing data (e.g. PI–PN) are operated. Specifically, empty pages PA–PJ are clocked by a first clock signal PCI_CLK that is derived from the frequency of operation of computer bus 120 (e.g. 33 MHz). Moreover, in-use pages PI–PN are clocked by a second clock signal FC_CLK that is at the same frequency as the frequency of peripheral bus 140 (e.g. 26.3 Mhz). In one implementation, all other portions of SPB 240 are operated at the same frequency as the second clock signal FC_CLK. In this implementation, sequencer module 115 writes via internal bus 121 data into an empty page, e.g. page PA. During the data transfer from sequencer module 115, a bus control logic included in SPB 240 drives a signal DST_STRETCH active on bus 121 to obtain additional time necessary for synchronization between PCI_CLK and a clock signal (e.g. at a frequency of 53 MHz) used by sequencer module 115. The stretching of duration is described in the U.S. Pat. No. 6,157,971 incorporated by reference above.

When a page is filled with data, SPB 240 transfers the page from a group 246 of empty pages PA–PJ to a group 247 of in-use pages PI–PN (e.g. by changing a pointer that identifies the last page in group 247). When all pages necessary for transmission of a payload are available (e.g. at least one page has the end-of-payload bit set), SPB 240 drives the payload ready signal. On receipt of the payload ready signal, SFC 230 creates a header using information from a TCB. Next, SFC 230 drives a third control signal (hereinafter "read enable signal") on bus 248 to indicate that SFC 230 is latching data from read data bus 243 in every clock cycle for one complete payload. In this manner, SFC 230 passes a complete message (including a header and a payload as discussed above) to bus 234 that is coupled to peripheral bus 140.

As illustrated in FIG. 3, one embodiment of host interface module 117 includes a restart memory 250 having groups SSA-SSN (wherein $A \leq J \leq N$, N being the total number of groups, equal to the number N of pages PA–PN in one implementation) organized in the form of a first-in-first-out (FIFO) memory. Each group SSJ includes an address storage location for holding a copy of the value in address register 260A, a count storage location for holding a copy of the value in count register 260C, and one or more additional storage locations for holding other values that are necessary to refetch data. For example, in one implementation, group SSJ includes a storage location for holding a copy of a pointer 260P to the list of scatter gather elements (also called "scatter gather data transfer pointer list"). In this example, pointer 260P is needed by a state machine (hereinafter "prefetch state machine") 270 that uses the value from pointer 260P to fetch the next scatter gather element to be used after the value in count register 260C goes to zero.

Restart memory 250 is accessed by a read pointer register 251 for reading the values in a group (e.g. group SSB), and a write pointer register 252 for writing values into a group. Host interface module 117 uses a value in register 252 to identify the group to be used in copying values of storage elements being used currently to transfer data, e.g. in response to a control signal (also called "snapshot signal") SPB_PCI_LD_RSTR_FIFO from SPB 240 becoming active (e.g. high). SPB 240 drives snapshot signal SPB_PCI_LD_RSTR_FIFO active at the beginning of a data transfer as discussed below. After taking a snapshot (by copying in response to signal SPB_PCI_LD_RSTR_FIFO becoming active) host interface module 117 increments the value held in register 252. Note that module 117 increments the value only if the new value is different from the value in read pointer register 251, to ensure that the next use of register 252 (for copying register values for the next data transfer) does not overwrite previously stored values currently being pointed to by read pointer register 251. Both registers 251 and 252 when incremented by more than the total number N, roll over to the first group SSA.

Moreover, host interface module 117 increments the value in read pointer register 251 when the data in a page indicated by register 251 is successfully transmitted, as indicated by a control signal SPB_PCI_ULD_RSTR_FIFO from SPB 240 becoming active. SPB 240 drives signal SPB_PCI_ULD_RSTR_FIFO active at the end of a data transfer as discussed below. Furthermore, host interface module 117 stores the value 0 in each of registers 251 and 252 when control signal SPB_CLR_RSTR_FIFO from SPB 240 becomes active (e.g. on reset as discussed below).

Figure 4:
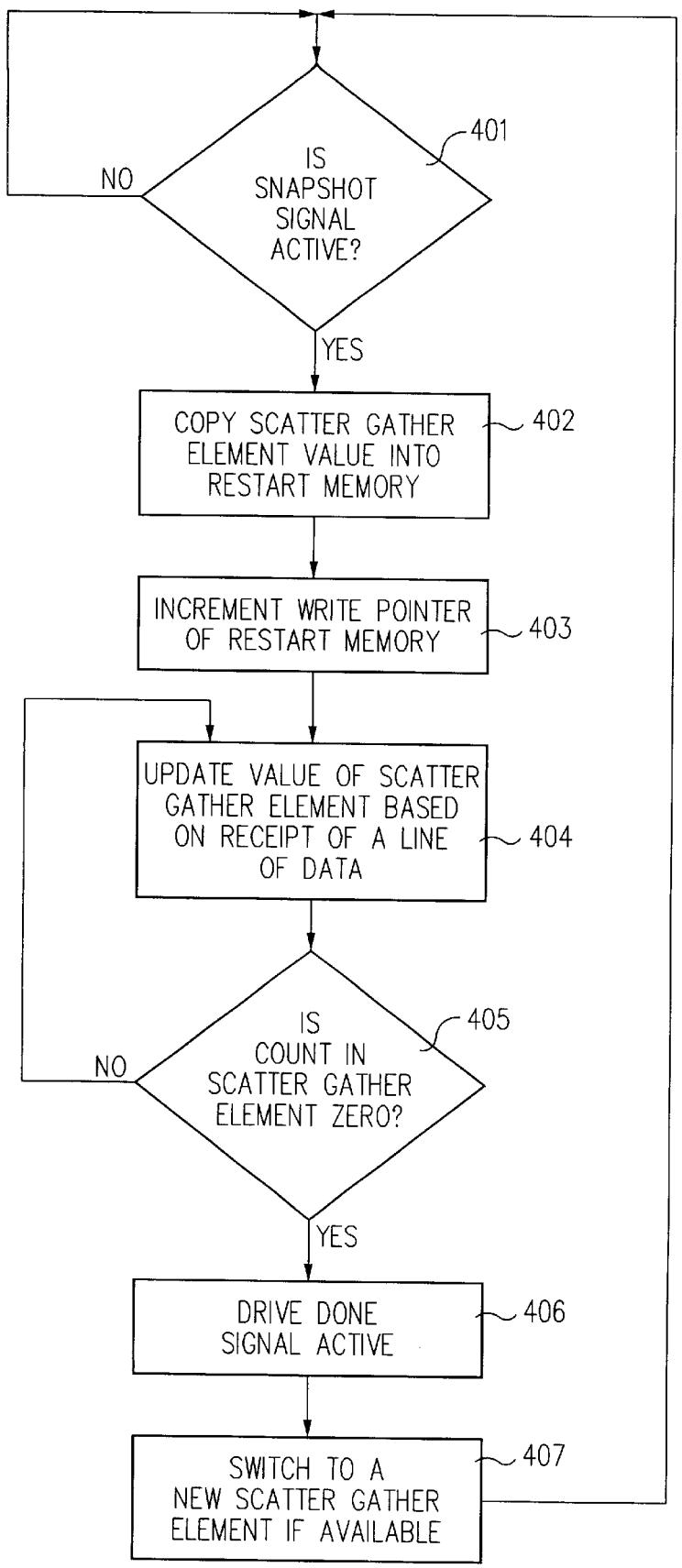
FIG. 4 illustrates, in a flow chart, the acts performed by one implementation of a host interface module while using the snapshot mechanism.

In one example, at power-up, both pointers 251 and 252 point to the same group, e.g. group SSJ. Thereafter, when a first line of a first page PA is loaded with data, host interface module 117 stores the values of registers 260 in a group SSJ, and increments write pointer 252 to identify the next group SSJ+1 (in response to snapshot signal SPB_PCI_LD_RSTR_FIFO going active as illustrated by act 401 in FIG. 4). After page PA is completely filled, SPB 240 transfers page PA from empty group 245 to in-use group 247, and thereafter SPB 240 starts writing into a first line of a new page PB. At this time, host interface module 117 takes a snapshot by copying (as illustrated by act 402) the values of registers 260 in group SSJ+1, and increments (as illustrated by act 403) write pointer 252 to identify the next group SSJ+2 (in response to signal SPB_PCI_LD_RSTR_FIFO going active a second time). Next, as a line of data is transferred to packer 291, host interface module 117 updates (as illustrated by act 404 in FIG. 4) values of the scatter gather element in storage elements 260. Specifically, as noted above, module 117 decrements the value in storage element 260C, and increments the value in storage element 260A by amount of data transferred from alignment circuit 292 to packer 291. At this time module 117 also checks if the value in count storage element 260C is zero (as illustrated by act 405) and if not, returns to act 404. If the value is zero, module 117 drives a status signal (also called "done signal") active (as illustrated by act 406). Thereafter, module 117 switches to using, if available, a new scatter gather element (e.g. switches from using storage element 280 to 281. A new scatter gather element is available (e.g. as indicated by a non-zero value in the count register 281C) if all the data for a sequence is transferred as indicated by a zero value in the register HST_XRDY_CNT. In response to the done signal, sequencer module 115 stores the values of the next scatter gather element in storage elements 280 and 260, so that module 117 can continue to fetch data from computer bus 120.

When all data of page PA is transmitted, host interface module 117 increments read pointer 251 to identify the next group SSJ+1 (in response to signal SPB_PCI_ULD_RSTR_FIFO going active). Thereafter, when page PB is transmitted, host interface module 117 increments read pointer 251 a second time to identify the next group SSJ+2 (in response to signal SPB_PCI_ULD_RSTR_FIFO going active a second time).

In one implementation, in addition to storage elements 260, host interface module 117 has additional storage elements 280: specifically, a host address register 280A and a host count register 280C that are both loaded with the same values as the values loaded in storage elements 260 at the beginning of data transfer. Host interface module 117 uses the value in host address register 280A to identify the location in system memory 164 for the data transfer and the value in the host count register 280C to identify the amount of the data to be transferred from the location. Host interface module 117 increments the value in count register 280C, and decrements the value in address register 280A by the amount of data received by module 117 (e.g. in latch L1). When the value in count register 280C goes to zero, host interface module 117 switches to another pair of storage elements 281, while sequencer module 115 stores new values in the previously-used storage elements 280.

Module 117 uses the corresponding values in storage elements 260 to identify the data being provided to SPB 240 by a packer 291. The values in storage elements 260 do not stay in synchronization with the values in storage elements 280, at least due to the presence of latches L0 and L1 and alignment circuit 292. Latches L0, L1, alignment circuit 292 and packer 291 are described in detail in U.S. Pat. No. 6,065,066 by Taikhim Henry Tan that was incorporated by reference above. The specific implementation of latches L0, L1, alignment circuit 292 and packer 291 is not a critical aspect of the invention.

In one embodiment, SPB 240 (FIG. 3) includes a buffer formed by a number of storage elements, that are organized into a number of fixed-size pages. Specifically, SPB 240 (FIG. 3) includes a buffer (also called "send payload memory") 241 that is organized into a number of pages PA–PN (wherein A≦I≦N, N being the total number of pages). Each of pages PA–PN has a fixed number of storage elements equal in number to the number of storage elements in another of pages PA–PN. In one implementation, the number N of pages is greater than a minimum number of pages required to hold a payload of the largest size that can be transmitted on peripheral bus 140. For example, when bus 140 conforms to the Fibre Channel specification, the payload has one of the following sizes: 128 bytes, 256 bytes, 512 bytes, 1024 bytes, 2048 bytes and 2112 bytes (in one implementation size 2112 is not supported; i.e. only sizes 128, 256, 512, 1024 and 2048 are supported). In this example, the storage elements included in receive payload memory 221 are greater in number than 2048 bytes, e.g. send payload memory 241 may include 2 payloads, wherein each payload has a size of 2048 bytes. So in this example, memory 241 has a total size of 4608 bytes that includes one extra page (of 512 bytes) in addition to 8 pages for two payloads. SPB 240 uses the extra page to prefetch data for a third payload from computer bus 120 simultaneously with the transmission of the first payload to peripheral bus 140. The simultaneous prefetch of the third payload and the first payload reduces or eliminates latency that is otherwise present when additional data needs to be fetched from bus 120.

During operation, when writing into a first storage location in a page (e.g. page PA), SPB 240 drives control signal SPB_PCI_LD_RSTR_FIFO active, thereby to cause module 117 to save a snapshot of values of various registers into restart memory 250. The saved snapshot is used by module 117 to refetch data from system memory 164 in case SPB 240 encounters an unexpected event (such as an error or a data transfer stall) during the transmission of the data. On encountering such an unexpected event, sequencer module 115 copies the snapshot from restart memory 250 into a portion of adapter memory 111 (FIG. 2A) that holds the corresponding TCB, for use at a later time to refetch the data as described herein. When the data is successfully transmitted, SPB 240 drives signal SPB_PCI_ULD_RSTR_FIFO active, thereby to cause module 117 to purge the snapshot from memory 250 (by advancing a read pointer as discussed above).

Although certain embodiments are described herein, numerous modifications and adaptations of the embodiments will be apparent to a person skilled in the art of designing adapter circuits. For example, although the invention is illustrated by a description of an adapter circuit for a host (also called "host adapter"), a similar or identical adapter circuit can be implemented for a target. Moreover, the snapshot mechanism described herein (formed by the restart memory and the related pointers) is not limited to adapter circuits, and can be used in any host interface module that requires suspension of the fetching of data from a first scatter-gather list to fetch data from a second scatter-gather list, and a later refetching from the first scatter-gather list. As the scatter-gather element to be used in refetching data is initially saved in the snapshot, the refetching occurs faster than if refetching is performed after calculation of the address at which the fetching was suspended (by traversing backwards through the scatter gather list). Such a snapshot mechanism can also be used when the fetching of data using a scatter-gather list is simply suspended and resumed at a later time. In one example of such a use, a server circuit transfers data in the form of a video stream to a number of client computers. The server circuit suspends the data transfer to process one or more control and management messages (e.g. enabling receipt of the video stream by another client computer), and then resumes the data transfer for the video stream.

Also, although certain unexpected events have been described above, other unexpected events may trigger the taking of a snapshot. Such other events in case of a Fibre Channel implementation of peripheral bus 140 include: (i) on an arbitrated loop, the node receiving the data initiates a close, or (ii) B—B credit expires and the port receiving the data, does not return a RRDY in a timely manner and a timer times-out, or (iii) fabric returns a busy due to congestion; or (iv) port returns a reject due to errors (this results in a frame being dropped), or (v) port returns a stop sequence, or (vi) E-E credit expires and the port receiving the data does not return ACK in a timely manner.

Therefore, numerous modifications and adaptations of the embodiments described herein are encompassed by the attached claims.

APPENDIX C

File name: rpb_debug_mux.v
Function: This module muxes the debug traces.
module rpb_debug_mux ( debug_trace,
              grp0_trace,
              grp1_trace,
              grp2_trace,
              grp3_trace, APPENDIX C-continued

```
                    grp4_trace,
                    grp5_trace,
                    grp6_trace,
                    grp7_trace,
                    rpb_debug):
//*******************************************************
// Input/Output Declarations
//*******************************************************
include "rpb.param"
input    [11:0]    grp0_trace;    // Group 0 debug trace
input    [11:0]    grp1_trace;    // Group 1 debug trace
input    [11:0]    grp2_trace;    // Group 2 debug trace
input    [11:0]    grp3_trace;    // Group 3 debug trace
input    [11:0]    grp4_trace;    // Group 4 debug trace
input    [11:0]    grp5_trace;    // Group 5 debug trace
input    [11:0]    grp6_trace;    // Group 6 debug trace
input    [11:0]    grp7_trace;    // Group 7 debug trace
input    [2:0]     rpb_debug;     // mux control
output   [11:0]    debug_trace;   // rpb debug traces
wire     [11:0]    debug_trace;
//#########################################
// debug trace select
//#########################################
assign #DLY debug_trace[11:0] =
                            (rpb_debug[2:0] == 3'b000) ? grp0_trace[11:0] :
                            (rpb_debug[2:0] == 3'b001) ? grp1_trace[11:0] :
                            (rpb_debug[2:0] == 3'b010) ? grp2_trace[11:0] :
                            (rpb_debug[2:0] == 3'b011) ? grp3_trace[11:0] :
                            (rpb_debug[2:0] == 3'b100) ? grp4_trace[11:0] :
                            (rpb_debug[2:0] == 3'b101) ? grp5_trace[11:0] :
                            (rpb_debug[2:0] == 3'b110) ? grp6_trace[11:0] :
                            (rpb_debug[2:0] == 3'b111) ? grp7_trace[11:0] :
                            grp0_trace[11:0];
endmodule
// design name   : rpb_pbuf_ram
// options       : -n -i -e -t/tools/verilnet/translation_lib.t
//                 -g/tools/verilent/ -orpb_pbuf_ram.v
// levels        : level adap
module rpb_pbuf_ram (di32, di31, di30, di29, di28, di27, di26, di25, di24,
    di23, di22, di21, di20, di19, di18, di17, di16, di15, di14, di13, di12,
    di11, di10, di9, di8, di7, di6, di5, di4, di3, di2, di1, di0, we_h8,
    we_h7, we_h6, we_h5, we_h4, we_h3, we_h2, we_h1, we_h0, we_l8, we_l7,
    we_l6, we_l5, we_l4, we_l3, we_l2, we_l1, we_l0, re8, re7, re6, re5, re4,
    re3, re2, re1, re0, do_h32, do_h31, do_h30, do_h29, do_h28, do_h27,
    do_h26, do_h25, do_h24, do_h23, do_h22, do_h21, do_h20, do_h19, do_h18,
    do_h17, do_h16, do_h15, do_h14, do_h13, do_h12, do_h11, do_h10, do_h9,
    do_h8, do_h7, do_h6, do_h5, do_h4, do_h3, do_h2, do_h1, do_h0, do_l32,
    do_l31, do_l30, do_l29, do_l28, do_l27, do_l26, do_l25, do_l24, do_l23,
    do_l22, do_l21, do_l20, do_l19, do_l18, do_l17, do_l16, do_l15, do_l14,
    do_l13, do_l12, do_l11, do_l10, do_l9, do_l8, do_l7, do_l6, do_l5, do_l4,
    do_l3, do_l2, do_l1, do_l0, ra05, ra04, ra03, ra02, ra01, ra00, ra15,
    ra14, ra13, ra12, ra11, ra10, ra25, ra24, ra23, ra22, ra21, ra20, ra35,
    ra34, ra33, ra32, ra31, ra30, ra45, ra44, ra43, ra42, ra41, ra40, ra55,
    ra54, ra53, ra52, ra51, ra50, ra65, ra64, ra63, ra62, ra61, ra60, ra75,
    ra74, ra73, ra72, ra71, ra70, ra85, ra84, ra83, ra82, ra81, ra80);
output do_h32, do_h31, do_h30, do_h29, do_h28, do_h27, do_h26, do_h25,
    do_h24, do_h23, do_h22, do_h21, do_h20, do_h19, do_h18, do_h17, do_h16,
    do_h15, do_h14, do_h13, do_h12, do_h11, do_h10, do_h9, do_h8, do_h7,
    do_h6, do_h5, do_h4, do_h3, do_h2, do_h1, do_h0, do_l32, do_l31, do_l30,
    do_l29, do_l28, do_l27, do_l26, do_l25, do_l24, do_l23, do_l22, do_l21,
    do_l20, do_l19, do_l18, do_l17, do_l16, do_l15, do_l14, do_l13, do_l12,
    do_l11, do_l10, do_l9, do_l8, do_l7, do_l6, do_l5, do_l4, do_l3, do_l2,
    do_l1, do_l0;
input di32, di31, di30, di29, di28, di27, di26, di25, di24, di23, di22,
    di21, di20, di19, di18, di17, di16, di15, di14, di13, di12, di11, di10,
    di9, di8, di7, di6, di5, di4, di3, di2, di1, di0, we_h8, we_h7, we_h6,
    we_h5, we_h4, we_h3, we_h2, we_h1, we_h0, we_l8, we_l7, we_l6, we_l5,
    we_l4, we_l3, we_l2, we_l1, we_l0, re8, re7, re6, re5, re4, re3, re2,
    re1, re0, ra05, ra04, ra03, ra02, ra01, ra00, ra15, ra14, ra13, ra12,
    ra11, ra10, ra25, ra24, ra23, ra22, ra21, ra20, ra35, ra34, ra33, ra32,
    ra31, ra30, ra45, ra44, ra43, ra42, ra41, ra40, ra55, ra54, ra53, ra52,
    ra51, ra50, ra65, ra64, ra63, ra62, ra61, ra60, ra75, ra74, ra73, ra72,
    ra71, ra70, ra85, ra84, ra83, ra82, ra81, ra80;
bushold \$1i1021 (.Z(do_h32));
bushold \$1i1022 (.Z(do_h31));
bushold \$1i1023 (.Z(do_h30));
bushold \$1i1024 (.Z(do_h29));
bushold \$1i1025 (.Z(do_h28));
bushold \$1i1026 (.Z(do_h27));
```

APPENDIX C-continued

```
bushold \$1i1027 (.Z(do_h26));
bushold \$1i1028 (.Z(do_h25));
bushold \$1i1029 (.Z(do_h24));
bushold \$1i1030 (.Z(do_h23));
bushold \$1i1031 (.Z(do_h22));
bushold \$1i1032 (.Z(do_h21));
bushold \$1i1033 (.Z(do_h20));
bushold \$1i1034 (.Z(do_h19));
bushold \$1i1035 (.Z(do_h18));
bushold \$1i1036 (.Z(do_h17));
bushold \$1i1037 (.Z(do_h16));
bushold \$1i1038 (.Z(do_h15));
bushold \$1i1039 (.Z(do_h14));
bushold \$1i1040 (.Z(do_h13));
bushold \$1i1041 (.Z(do_h12));
bushold \$1i1042 (.Z(do_h11));
bushold \$1i1043 (.Z(do_h10));
bushold \$1i1044 (.Z(do_h9));
bushold \$1i1045 (.Z(do_h8));
bushold \$1i1046 (.Z(do_h7));
bushold \$1i1047 (.Z(do_h6));
bushold \$1i1048 (.Z(do_h5));
bushold \$1i1049 (.Z(do_h4));
bushold \$1i1050 (.Z(do_h3));
bushold \$1i1051 (.Z(do_h2));
bushold \$1i1052 (.Z(do_h1));
bushold \$1i1053 (.Z(do_h0));
bushold \$1i1094 (.Z(do_l32));
bushold \$1i1095 (.Z(do_l31));
bushold \$1i1096 (.Z(do_l30));
bushold \$1i1097 (.Z(do_l29));
bushold \$1i1098 (.Z(do_l28));
bushold \$1i1099 (.Z(do_l27));
bushold \$1i1100 (.Z(do_l26));
bushold \$1i1101 (.Z(do_l25));
bushold \$1i1102 (.Z(do_l24));
bushold \$1i1103 (.Z(do_l23));
bushold \$1i1104 (.Z(do_l22));
bushold \$1i1105 (.Z(do_l21));
bushold \$1i1106 (.Z(do_l20));
bushold \$1i1107 (.Z(do_l19));
bushold \$1i1108 (.Z(do_l18));
bushold \$1i1109 (.Z(do_l17));
bushold \$1i1110 (.Z(do_l16));
bushold \$1i1111 (.Z(do_l15));
bushold \$1i1112 (.Z(do_l14));
bushold \$1i1113 (.Z(do_l13));
bushold \$1i1114 (.Z(do_l12));
bushold \$1i1115 (.Z(do_l11));
bushold \$1i1116 (.Z(do_l10));
bushold \$1i1117 (.Z(do_l9));
bushold \$1i1118 (.Z(do_l8));
bushold \$1i1119 (.Z(do_l7));
bushold \$1i1120 (.Z(do_l6));
bushold \$1i1121 (.Z(do_l5));
bushold \$1i1122 (.Z(do_l4));
bushold \$1i1123 (.Z(do_l3));
bushold \$1i1124 (.Z(do_l2));
bushold \$1i1125 (.Z(do_l1));
bushold \$1i1126 (.Z(do_l0));
rf64x66e2t urm3 (.DI65(di32), .DI64(di31), .DI63(di30), .DI62(di29), .DI61
    (di28), .DI60(di27), .DI59(di26), .DI58(di25), .DI57(di24), .DI56(di23)
    .DI55(di22), .DI54(di21), .DI53(di20), .DI52(di19), .DI51(di18), .DI50
    (di17), .DI49(di16), .DI48(di15), .DI47(di14), .DI46(di13), .DI45(di12)
    .DI44(di11), .DI43(di10), .DI42(di9), .DI41(di8), .DI40(di7), .DI39
    (di6), .DI38(di5), .DI37(di4), .DI36(di3), .DI35(di2), .DI34(di1), .DI33
    (di0), .DI32(di32), .DI31(di31), .DI30(di30), .DI29(di29), .DI28(di28),
    .DI27(di27), .DI26(di26), .DI25(di25), .DI24(di24), .DI23(di23), .DI22
    (di22), .DI21(di21), .DI20(di20), .DI19(di19), .DI18(di18), .DI17(di17)
    .DI16(di16), .DI15(di15), .DI14(di14), .DI13(di13), .DI12(di12), .DI11
    (di11), .DI10(di10), .DI9(di9), .DI8(di8), .DI7(di7), .DI6(di6), .DI5
    (di5 .DI4(di4), .DI3(di3), .DI2(di2), .DI1(di1), .DI0(di0), .WE1
    (we_h3), .WE0(we_l3), .OE1(re3), .OE0(re3), .A5(ra35), .A4(ra34), .A3
    (ra33), .A2(ra32), A1(ra31), .A0(ra30), .DO65(do_h32), .DO64(do_h31),
    .DO63(do_h30), .DO62(do_h29), .DO61(do_h28), .DO60(do_h27), .DO59
    (do_h26), .DO58(do_h25), .DO57(do_h24), .DO56(do_h23), .DO55(do_h22),
    .DO54(do_h21), .DO53(do_h20), .DO52(do_h19), .DO51(do_h18), .DO50
    (do_h17), .DO49(do_h16), .DO48(do_h15), .DO47(do_h14), .DO46(do_h13),
    .DO45(do_h12), .DO44(do_h11), .DO43(do_h10), .DO42(do_h9), .DO41(do_h8),
```

APPENDIX C-continued

```
       .DO40(do_h7), .DO39(do_h6), .DO38(do_h5), .DO37(do_h4), .DO36(do_h3),
       .DO35(do_h2), .DO34(do_h1), .DO33(do_h0), .DO32(do_132), DO31(do_131),
       .DO30(do_130), .DO29(do_129), .DO28(do_128), .DO27(do_127), .DO26
       (do_126), .DO25(do_125), .DO24(do_124), .DO23(do_123), .DO22(do_122),
       .DO21(do_121), .DO20(do_120), .DO19(do_119), .DO18(do_118), .DO17
       (do_117), .DO16(do_116), .DO15(do_115), .DO14(do_114), .DO13(do_113),
       .DO12(do_112), .DO11(do_111), .DO10(do_110), .DO9(do_19), DO8(do_18),
       .DO7(do_17), .DO6(do_16), .DO5(do_15), .DO4(do_14), .DO3(do_13), .DO2
       (do_12), .DO1(do_11), .DO0(do_10));
rf64x66e2t urm2 (.DI65(di32), .DI64(di31), .DI63(di30), .DI62(di29), .DI61
       (di28), .DI60(di27), .DI59(di26), .DI58(di25), .DI57(di24), .DI56(di23)
       .DI55(di22), .DI54(di21), .DI53(di20), .DI52(di19), .DI51(di18), .DI50
       (di17), .DI49(di16), .DI48(di15), .DI47(di14), .DI46(di13), .DI45(di12)
       .DI44(di11), .DI43(di10), .DI42(di9), .DI41(di8), .DI40(di7), .DI39
       (di6), .DI38(di5), .DI37(di4), .DI36(di3), .DI35(di2), .DI34(di1), .DI33
       (di0), .DI32(di32), .DI31(di31), .DI30(di30), .DI29(di29), .DI28(di28),
       .DI27(di27), .DI26(di26), .DI25(di25), .DI24(di24), .DI23(di23), .DI22
       (di22), .DI21(di21), .DI20(di20), .DI19(di19), .DI18(di18), .DI17(di17)
       .DI16(di16), .DI15(di15), .DI14(di14), .DI13(di13), .DI12(di12), .DI11
       (di11), .DI10(di10), .DI9(di9), .DI8(di8), .DI7(di7), .DI6(di6), .DI5
       (di5), .DI4(di4), .DI3(di3), .DI2(di2), .DI1(di1), .DI0(di0), .WE1
       (we_h2), .WE0(we_12), .OE1(re2), .OE0(re2), .A5(ra25), .A4(ra24), .A3
       (ra23), .A2(ra22), .A1(ra21), .A0(re20), .DO65(do_h32), .DO64(do_h31),
       .DO63(do_h30), .DO62(do_h29), .DO61(do_h28), .DO60(do_h27), .DO59
       (do_h26), .DO58(do_h25), .DO57(do_h24), .DO56(do_h23), .DO55(do_h22),
       .DO54(do_h21), .DO53(do_h20), .DO52(do_h19), .DO51(do_h18), .DO50
       (do_h17), .DO49(do_h16), .DO48(do_h15), DO47(do_h14), .DO46(do_h13),
       .DO45(do_h12), .DO44(do_h11), .DO43(do_h10), .DO42(do_h9), .DO41(do_h8),
       .DO40(do_h7), .DO39(do_h6), .DO38(do_h5), .DO37(do_h4), .DO36(do_h3),
       .DO35(do_h2), .DO34(do_h1), .DO33(do_h0), .DO32(do_132), .DO31(do_131),
       .DO30(do_130), .DO29(do_129), .DO28(do_128), .DO27(do_127), .DO26
       (do_126), .DO25(do_125), .DO24(do_124), .DO23(do_123), .DO22(do_122),
       .DO21(do_121), .DO20(do_120), .DO19(do_119), .DO18(do_118), .DO17
       (do_117), .DO16(do_116), .DO15(do_115), .DO14(do_114), .DO13(do_113),
       .DO12(do_112), .DO11(do_111), .DO10(do_110), .DO9(do_19), .DO8(do_18),
       .DO7(do_17), .DO6(do_16), .DO5(do_15), .DO4(do_14), .DO3(do_13), .DO2
       (do_12), .DO1(do_11), .DO0(do_10));
rf64x66e2t urm1, (.DI65(di32), .DI64(di31), .DI63(di30), .DI62(di29), .DI61
       (di28), .DI60(di27), .DI59(di26), .DI58(di25), .DI57(di24), .DI56(di23),
       .DI55(di22), .DI54(di21), .DI53(di20), .DI52(di19), .DI51(di18), .DI50
       (di17), .DI49(di16), .DI48(di15), .DI47(di14), .DI46(di13), .DI45(di12),
       .DI44(di11), .DI43(di10), .DI42(di9), .DI41(di8), .DI40(di7), .DI39
       (di6), .DI38(di5), .DI37(di4), .DI36(di3), .DI35(di2), .DI34(di1), .DI33
       (di0), .DI32(di32), .DI31(di31), .DI30(di30), .DI29(di29), .DI28(di28),
       .DI27(di27), .DI26(di26), .DI25(di25), .DI24(di24), .DI23(di23), .DI22
       (di22), .DI21(di21), .DI20(di20), .DI19(di19), .DI18(di18), .DI17(di17),
       .DI16(di16), .DI15(di15), .DI14(di14), .DI13(di13), .DI12(di12), .DI11
       (di11), .DI10(di10), .DI9(di9), .DI8(di8), .DI7(di7), .DI6(di6), .DI5
       (di5), .DI4(di4), .DI3(di3), .DI2(di2), .DI1(di1), .DI0(di0), .WE1
       (we_h1), .WE0(we_11), ,OE1(re1), .OE0(re1), .A5(ra15), .A4(ra14), .A3
       (ra13), .A2(ra12), .A1(ra11), .A0(ra10), .DO65(do_h32), .DO64(do_h31),
       .DO63(do_h30), .DO62(do_h29), .DO61(do_h28), .DO60(do_h27), .DO59
       (do_h26), .DO18(do_h25), .DO57(do_h24), .DO56(do_h23), .DO55(do_h22),
       .DO54(do_h21), .DO53(do_h20), .DO52(do_h19), .DO51(do_h18), .DO50
       (do_h17), .DO49(do_h16), .DO48(do_h15), .DO47(do_h14), .DO46(do_h13),
       .DO45(do_h12), .DO44(do_h11), .DO43(do_h10), .DO42(do_h9), .DO41(do_h8),
       .DO40(do_h7), .DO39(do_h6), .DO38(do_h5), .DO37(do_h4), .DO36(do_h3),
       .DO35(do_h2), .DO34(do_h1), .DO33(do_h0), .DO32(do_132), .DO31(do_131),
       .DO30(do_130), .DO29(do_129), .DO28(do_128), .DO27(do_127), .DO26
       (do_126), .DO25(do_125), .DO24(do_124), .DO23(do_123), .DO22(do_122),
       .DO21(do_121), .DO20(do_120), .DO19(do_119), .DO18(do_118), .DO17
       (do_117), .DO16(do_116), .DO15(do_115), .DO14(do_114), .DO13(do_113),
       .DO12(do_112), .DO11(do_111), .DO10(do_110), .DO9(do_19), .DO8(do_18),
       .DO7(do_17), .DO6(do_16), .DO5(do_15), .DO4(do_14), .DO3(do_13), .DO2
       (do_12), .DO1(do_11), .DO0(do_10));
rf64x66e2t urm0 (.DI65(di32), .DI64(di31), .DI63(di30), .DI62(di29), .DI61
       (di28), .DI60(di27), .DI59(di26), .DI58(di25), .DI57(di24), .DI56(di23)
       .DI55(di22), .DI54(di21), .DI53(di20), .DI52(di19), .DI51(di18), .DI50
       (di17), .DI49(di16), .DI48(di15), .DI47(di14), .DI46(di13), .DI45(di12),
       .DI44(di11), .DI43(di10), .DI42(di9), .DI41(di8), .DI40(di7), .DI39
       (di6), .DI38(di5), .DI37(di4), .DI36(di3), .DI35(di2), .DI34(di1), .DI33
       (di0), .DI32(di32), .DI31(di31), .DI30(di30), .DI29(di29), .DI28(di28),
       .DI27(di27), .DI26(di26), .DI25(di25), .DI24(di24), .DI23(di23), .DI22
       (di22), .DI21(di21), .DI20(di20), .DI19(di19), .DI18(di18), .DI17(di17),
       .DI16(di16), .DI15(di15), .DI14(di14), .DI13(di13), .DI12(di12), .DI11
       (di11), .DI10(di10), .DI9(di9), .DI8(di8), .DI7(di7), .DI6(di6), .DI5
       (di5), .DI4(di4), .DI3(di3), .DI2(di2), .DI1(di1), .DI0(di0), .WE1
       (we_h0), WE0(we_10), .OE1(re0), .OE0(re0), .A5(ra05), .A4(ra04), .A3
       (ra03), .A2(ra02), .A1(ra01), .A0(ra00), .DO65(do_h32), .DO64(do_h31),
```

APPENDIX C-continued

.DO63(do_h30), .DO62(do_h29), .DO61(do_h28), .DO60(do_h27), .DO59
(do_h26), .DO58(do_h25), .DO57(do_h24), .DO56(do_h23), .DO55(do_h22),
.DO54(do_h21), .DO53(do_h20), .DO52(do_h19), .DO51(do_h18), .DO50
(do_h17), .DO49(do_h16), .DO48(do_h15), .DO47(do_h14), .DO46(do_h13),
.DO45(do_h12), .DO44(do_h11), .DO43(do_h10), .DO42(do_h9), .DO41(do_h8),
.DO40(do_h7), .DO39(do_h6), .DO38(do_h5), .DO37(do_h4), .DO36(do_h3),
.DO35(do_h2), .DO34(do_h1), .DO33(do_h0), .DO32(do_l32), .DO31(do_l31),
.DO30(do_l30), .DO29(do_l29), .DO28(do_l28), .DO27(do_l27), .DO26
(do_l26), .DO25(do_l25), .DO24(do_l24), .DO23(do_l23), .DO22(do_l22),
.DO21(do_l21), .DO20(do_l20), .DO19(do_l19), .DO18(do_l18), .DO17
(do_l17), .DO16(do_l16), .DO15(do_l15), .DO14(do_l14), .DO13(do_l13),
.DO12(do_l12), .DO13(do_l11), .DO10(do_l10), .DO9(do_l9), .DO8(do_l8),
.DO7(do_l7), .DO6(do_l6), .DO5(do_l5), .DO4(do_l4), .DO3(do_l3), .DO2
(do_l2), .DO1(do_l1), .DO0(do_l0));
rf64x66e2t urm7 (.DI65(di32), .DI64(di31), .DI63(di30), .DI62(di29), .DI61
(di28), .DI60(di27), .DI59(di26), .DI58(di25), .DI57(di24), .DI56(di23),
.DI55(di22), .DI54(di21), .DI53(di20), .DI52(di19), .DI51(di18), .DI50
(di17), .DI49(di16), .DI48(di15), .DI47(di14), .DI46(di13), .DI45(di12),
.DI44(di11), .DI43(di10), .DI42(di9), .DI41(di8), .DI40(di7), .DI39
(di6), .DI38(di5), .DI37(di4), .DI36(di3), .DI35(di2), .DI34(di1), .DI33
(di0), .DI32(di32), .DI31(di31), .DI30(di30), .DI29(di29), .DI28(di28),
.DI27(di27), .DI26(di26), .DI25(di25), .DI24(di24), .DI23(di23), .DI22
(di22), .DI21(di21), .DI20(di20), .DI19(di19), .DI18(di18), .DI17(di17),
.DI16(di16), .DI15(di15), .DI14(di14), .DI13(di13), .DI12(di12), .DI11
(di11), .DI10(di10), .DI9(di9), .DI8(di8), .DI7(di7), .DI6(di6), .DI5
(di5), .DI4(di4), .DI3(di3), .DI2(di2), .DI1(di1), .DI0(di0), .WE1
(we_h7), .WE0(we_l7), .OE1(re7), .OE0(re7), .A5(ra75), .A4(ra74), .A3
(ra73), .A2(ra72), .A1(ra71), .A0(ra70), .DO65(do_h32), .DO64(do_h31),
.DO63(do_h30), .DO62(do_h29), .DO61(do_h28), .DO60(do_h27), .DO59
(do_h26), .DO58(do_h25), .DO57(do_h24), .DO56(do_h23), .DO55(do_h22),
.DO54(do_h21), .DO53(do_h20), .DO52(do_h19), .DO51(do_h18), .DO50
(do_h17), .DO49(do_h16), .DO48(do_h15), .DO47(do_h14), .DO46(do_h13),
.DO45(do_h12), .DO44(do_h11), .DO43(do_h10), .DO42(do_h9), .DO41(do_h8),
.DO40(do_h7), .DO39(do_h6), .DO38(do_h5), .DO37(do_h4), .DO36(do_h3),
.DO35(do_h2), .DO34(do_h1), .DO33(do_h0), .DO32(do_l32), .DO31(do_l31),
.DO30(do_l30), .DO29(do_l29), .DO28(do_l28), .DO27(do_l27), .DO26
(do_l26), .DO25(do_l25), .DO24(do_l24), .DO23(do_l23), .DO22(do_l22),
.DO21(do_l21), .DO20(do_l20), .DO19(do_l19), .DO18(do_l18), .DO17
(do_l17), .DO16(do_l16), .DO15(do_l15), .DO14(do_l14), .DO13(do_l13),
.DO32(do_l12), .DO11(do_l11), .DO10(do_l10), .DO9(do_l9), .DO8(do_l8),
.DO7(do_l7), .DO6(do_l6), .DO5(do_l5), .DO4(do_l4), .DO3(do_l3), .DO2
(do_l2), .DO1(do_l1), .DO0(do_l0));
rf64x66e2t urm8 (.DI65(di32), .DI64(di31), .DI63(di30), .DI62(di29), .DI61
(di28), .DI60(di27), .DI59(di26), .DI58(di25), .DI57(di24), .DI56(di23),
.DI55(di22), .DI54(di21), .DI53(di20), .DI52(di19), .DI51(di18), .DI50
(di17), .DI49(di16), .DI48(di15), .DI47(di14), .DI46(di13), .DI45(di12),
.DI44(di11), .DI43(di10), .DI42(di9), .DI41(di8), .DI40(di7), .DI39
(di6), .DI28(di5), .DI37(di4), .DI36(di3), .DI35(di2), .DI34(di1), .DI33
(di0), .DI32(di32), .DI31(di31), .DI30(di30), .DI29(di29), .DI28(di28),
.DI27(di27), .DI26(di26), .DI25(di25), .DI24(di24), .DI23(di23), .DI22
(di22), .DI21(di21), .DI20(di20), .DI19(di19), .DI18(di18), .DI17(di17),
.DI16(di16), .DI15(di15), .DI14(di14), .DI13(di13), .DI12(di12), .DI11
(di11), .DI10(di10), .DI9(di9), .DI8(di8), .DI7(di7), .DI6(di6), .DI5
(di5), .DI4(di4), .DI3(di3), .DI2(di2), .DI1(di1), .DI0(di0), .WE1
(we_h8), .WE0(we_l8), .OE1(re8), .OE0(re8), .A5(ra85), .A4(ra84), .A3
(ra83), .A2(ra82), .A1(ra81), .A0(ra80), .DO65(do_h32), .DO64(do_h31),
.DO63(do_h30), .DO62(do_h29), .DO61(do_h28), .DO60(do_h27), .DO59
(do_h26), .DO58(do_h25), .DO57(do_h24), .DO56(do_h23), .DO55(do_h22),
.DO54(do_h21), .DO53(do_h20), .DO52(do_h19), .DO51(do_h18), .DO50
(do_h17), .DO49(do_h16), .DO48(do_h15), .DO47(do_h14), .DO46(do_h13),
.DO45(do_h12), .DO44(do_h11), .DO43(do_h10), .DO42(do_h9), .DO41(do_h8),
.DO40(do_h7), .DO39(do_h6), .DO38(do_h5), .DO37(do_h4), .DO36(do_h3),
.DO35(do_h2), .DO34(do_h1), .DO33(do_h0), .DO32(do_l32), .DO31(do_l31),
.DO30(do_l30), .DO29(do_l29), .DO28(do_l28), .DO27(do_l27), .DO26
(do_l26), .DO25(do_l25), .DO24(do_l24), .DO23(do_l23), .DO22(do_l22),
.DO21(do_l21), .DO20(do_l20), .DO19(do_l19), .DO18(do_l18), .DO17
(do_l17), .DO16(do_l16), .DO15(do_l15), .DO14(do_l14), .DO13(do_l13),
.DO12(do_l12), .DO11(do_l11), .DO10(do_l10), .DO9(do_l9), .DO8(do_l8),
.DO7(do_l7), .DO6(do_l6), .DO5(do_l5), .DO4(do_l4), .DO3(do_l3), .DO2
(do_l2), .DO1(do_l1), .DO0(do_l0));
rf64x66e2t urm5 (.DI65(di32), .DI64(di31), .DI63(di30); .DI62(di29), .DI61
(di28), .DI60(di27), .DI59(di26), .DI58(di25), .DI57(di24), .DI56(di23),
.DI55(di22), .DI54(di21), .DI53(di20), .DI52(di19), .DI51(di18), .DI50
(di17), .DI49(di16), .DI48(di15), .DI47(di14), .DI46(di13), .DI45(di12),
.DI44(di11), .DI43(di10), .DI42(di9), .DI41(di8), .DI40(di7), .DI39
(di6), .DI38(di5), .DI37(di4), .DI36(di3), .DI35(di2), .DI34(di)), .DI33
(di0), .DI32(di32), .DI31(di31), .DI30(di30), .DI29(di29), .DI28(di28),
.DI27(di27), .DI26(di26), .DI25(di25), .DI24(di24), .DI23(di23), .DI22
(di22), .DI21(di21), .DI20(di20), .DI19(di19), .DI18(di18), .DI17(di17),

APPENDIX C-continued

```
    .DI16(di16), .DI15(di15), .DI14(di14), .DI13(di13), .DI12(di12), .DI11
        (di11), .DI10(di10), .DI9(di9), .DI8(di8), .DI7(di7), .DI6(di6), .DI5
        (di5), .DI4(di4), .DI3(di3), .DI2(di2), .DI1(di1), .DI0(di0), .WE1
        (we_h5), .WE0(we_15), .OE1(re5), .OE0(re5), .A5(ra55), .A4(ra54), .A3
        (ra53), .A2(ra52), .A1(ra51), .A0(ra50), .DO65(do_h32), .DO64(do_h31),
        .DO63 (do_h30), .DO62(do_h29), .DO61(do_h28), .DO60(do_h27), .DO59
        (do_h26), .DO58(do_h25), .DO57(do_h24), .DO56(do_h23), .DO55(do_h22),
        .DO54(do_h21), .DO53(do_h20), .DO52(do_h19), .DO51(do_h18), .DO50
        (do_h17), .DO49(do_h16), .DO48(do_h15), .DO47(do_h14), .DO46(do_h13),
        .DO45(do_h12), .DO44(do_h11), .DO43(do_h10), .DO42(do_h9), .DO41(do_h8),
        .DO40(do_h7), .DO39(do_h6), .DO38(do_h5), .DO37(do_h4), .DO36(do_h3),
        .DO35(do_h2), .DO34(do_h1), .DO33(do_h0), .DO32(do_132), .DO31(do_131),
        .DO30(do_130), .DO29(do_129), .DO28(do_128), .DO27(do_127), .DO26
        (do_126), .DO25(do_125), .DO24(do_124), .DO23(do_123), .DO22(do_122),
        .DO21(do_121), .DO20(do_120), .DO19(do_119), .DO18(do_118), .DO17
        (do_117), .DO16(do_116), .DO15(do_115), .DO14(do_114), .DO13(do_113),
        .DO12(do_112), .DO11(do_111), .DO10(do_110), .DO9(do_19), .DO8(do_18),
        .DO7(do_17), .DO6(do_16), .DO5(do_15), .DO4(do_14), .DO3(do_13), .DO2
        (do_12), .DO1(do_11), .DO0(do_10));
rf64x66e2t urm6 (.DI65(di32), .DI64(di31), .DI63(di30), .DI62(di29), .DI61
        (di28), .DI60(di27), .DI59(di26), .DI58(di25), .DI57(di24), .DI56(di23),
        .DI55(di22), .DI54(di21), .DI53(di20), .DI52(di19), .DI51(di18), .DI50
        (di17), .DI49(di16), .DI48(di15), .DI47(di14), .DI46(di13), .DI45(di12),
        .DI44(di11), .DI43(di10), .DI42(di9), .DI41(di8), .DI40(di7), .DI39
        (di6), .DI38(di5), .DI37(di4), .DI36(di3), .DI35(di2), .DI34(di1), .DI33
        (di0), .DI32(di32), .DI31(di31), .DI30(di30), .DI29(di29), .DI28(di28),
        .DI27(di27), .DI26(di26), .DI25(di25), .DI24(di24), .DI23(di23), .DI22
        (di22), .DI21(di21), .DI20(di20), .DI19(di19), .DI18(di18), .DI17(di17),
        .DI16(di16), .DI15(di15), .DI14(di14), .DI13(di13), .DI12(di12), .DI11
        (di11), .DI10(di10), .DI9(di9), .DI8(di8), .DI7(di7), .DI6(di6), .DI5
        (di5), .DI4(di4), .DI3(di3), .DI2(di2), .DI1(di1), .DI0(di0), .WE1
        (we_h6), .WE0(we_16), .OE1(re6), .OE0(re6), .A5(ra65), .A4(ra64), .A3
        (ra63), .A2(ra62), .A1(ra61), .A0(ra60), .DO65(do_h32), .DO64(do_h31),
        .DO63(da_h30), .DO62(do_h29), .DO61(do_h28), .DO60(do_h27), .DO59
        (do_h26), .DO58(do_h25), .DO57(do_h24), .DO56(do_h23), .DO55(do_h22),
        .DO54(do_h21), .DO53(do_h20), .DO52(do_h19), .DO51(do_h18), .DO50
        (do_h17), .DO49(do_h16), .DO48(do_h15), .DO47(do_h14), .DO46(do_h13),
        .DO45(do_h12), .DO44(do_h11), .DO43(do_h10), .DO42(do_h9), .DO41(do_h8),
        .DO40(do_h7), .DO39(do_h6), .DO38(do_h5), .DO37(do_h4), .DO36(do_h3),
        .DO35(do_h2), .DO34(do_h1), .DO33(do_h0), .DO32(do_132), .DO31(do_131),
        .DO30(do_130), .DO29(do_129), .DO28(do_128), .DO27(do_127), .DO26
        (do_126), .DO25(do_125), .DO24(do_124), .DO23(do_123), .DO22(do_122),
        .DO21(do_121), .DO20(do_120), .DO19(do_119), .DO18(do_118), .DO17
        (do_117), .DO16(do_116), .DO15(do_115), .DO14(do_114), .DO13(do_113),
        .DO12(do_112), .DO11(do_111), .DO10(do_110), .DO9(do_19), .DO8(do_18),
        .DO7(do_17), .DO6(do_16), .DO5(do_15), .DO4(do_14), .DO3(do_13), .DO2
        (do_12), .DO1(do_11), .DO0(do_10));
rf64x66e2t urm4 (.DI65(di32), .DI64(di31), .DI63(di30), .DI62(di29), .DI61
        (di28), .DI60(di27), .DI59(di26), .DI58(di25), .DI57(di24), .DI56(di23),
        .DI55(di22), .DI54(di21), .DI53(di20), .DI52(di19), .DI51(di18), .DI50
        (di17), .DI49(di16), .DI48(di15), .DI47(di14), .DI46(di13), .DI45(di12),
        .DI44(di11), .DI43(di10), .DI42(di9), .DI41(di8), .DI40(di7), .DI39
        (di6), .DI38(di5), .DI37(di4), .DI36(di3), .DI35(di2), .DI34(di1), .DI33
        (di0), .DI32(di32), .DI31(di31), .DI30(di30), .DI29(di29), .DI28(di28),
        .DI27(di27), .DI26(di26), .DI25(di25), .DI24(di24), .DI23(di23), .DI22
        (di22), .DI21(di21), .DI20(di20), .DI19(di19), .DI18(di18), .DI17(di17),
        .DI16(di16), .DI15(di15), .DI14(di14), .DI13(di13), .DI12(di12), .DI11
        (di11), .DI10(di10), .DI9(di9), .DI8(di8), .DI7(di7), .DI6(di6), .DI5
        (di5), .DI4(di4), .DI3(di3), .DI2(di2), .DI1(di), .DI0(di0), .WE1
        (we_h4), .WEO(we_14), .OE1(re4), .OE0(re4), .A5(ra45), .A4(ra44), .A3
        (ra43), .A2(ra42), .A1(ra41), .A0(ra40), .DO65(do_h32), .DO64(do_h31),
        .DO63(do_h30), .DO62(do_h29), .DO61(do_h28), .DO60(do_h27), .DO59
        (do_h26), .DO58(do_h25), .DO57(do_h24), .DO56(do_h23), .DO55(do_h22),
        .DO54(do_h21), .DO53(do_h20), .DO52(do_h19), .DO51(do_h18), .DO50
        (do_h17), .DO49(do_h16), .DO48(do_h15), .DO47(do_h14), .DO46(do_h13),
        .DO45(do_h12), .DO44(do_h11), .DO43(do_h10), .DO42(do_h9), .DO41(do_h8),
        .DO40(do_h7), .DO39(do_h6), .DO38(do_h5), .DO37(do_h4), .DO36(do_h3),
        .DO35(do_h2), .DO34(do_h1), .DO33(do_h0), .DO32(do_132), .DO31(do_131),
        .DO30(do_130), .DO29(do_129), .DO28(do_128), .DO27(do_127), .DO26
        (do_126), .DO25(do_125), .DO24(do_124), .DO23(do_123), .DO22(do_122),
        .DO21(do_121), .DO20(do_120), .DO19(do_119), .DO18(do_118), .DO17
        (do_117), .DO16(do_116), .DO15(do_115), .DO14(do_114), .DO13(do_113),
        .DO12(do_112), .DO11(do_111), .DO10(do_110), .DO9(do_19), .DO8(do_18),
        .DO7(do_17), .DO6(do_16), .DO5(do_15), .DO4(do_14), .DO3(do_13), .DO2
        (do_12), .DO1(do_11), .DO0(do_10));
// warning - component \$1i1126 has unconnected pins: 0 input, 0 output, 1 ino
ut.
// warning - component \$1i1125 has unconnected pins: 0 input, 0 output, 1 ino
ut.
```

APPENDIX C-continued

```
// warning - component \$1i1124 has unconnected pins: 0 input, 0 output, 1 ino
ut.
// warning - component \$1i1123 has unconnected pins: 0 input, 0 output, 1 ino
ut.
// warning - component \$1i1122 has unconnected pins: 0 input, 0 output, 1 ino
ut.
// warning - component \$1i1121 has unconnected pins: 0 input, 0 output, 1 ino
ut.
// warning - component \$1i1120 has unconnected pins: 0 input, 0 output, 1 ino
ut.
// warning - component \$1i1119 has unconnected pins: 0 input, 0 output, 1 ino
ut.
// warning - component \$1i1118 has unconnected pins: 0 input, 0 output, 1 ino
ut.
// warning - component \$1i1117 has unconnected pins: 0 input, 0 output, 1 ino
ut.
// warning - component \$1i1116 has unconnected pins: 0 input, 0 output, 1 ino
ut.
// warning - component \$1i1115 has unconnected pins: 0 input, 0 output, 1 ino
ut.
// warning - component \$1i1114 has unconnected pins: 0 input, 0 output, 1 ino
ut.
// warning - component \$1i1113 has unconnected pins: 0 input, 0 output, 1 ino
ut.
// warning - component \$1i1112 has unconnected pins: 0 input, 0 output, 1 ino
ut.
// warning - component \$1i1111 has unconnected pins: 0 input, 0 output, 1 ino
ut.
// warning - component \$1i1110 has unconnected pins: 0 input, 0 output, 1 ino
ut.
// warning - component \$1i1109 has unconnected pins: 0 input, 0 output, 1 ino
ut.
// warning - component \$1i1108 has unconnected pins: 0 input, 0 output, 1 ino
ut.
// warning - component \$1i1107 has unconnected pins: 0 input, 0 output, 1 ino
ut.
// warning - component \$1i1106 has unconnected pins: 0 input, 0 output, 1 ino
ut.
// warning - component \$1i1105 has unconnected pins: 0 input, 0 output, 1 ino
ut.
// warning - component \$1i1104 has unconnected pins: 0 input, 0 output, 1 ino
ut.
// warning - component \$1i1103 has unconnected pins: 0 input, 0 output, 1 ino
ut.
// warning - component \$1i1102 has unconnected pins: 0 input, 0 output, 1 ino
ut.
// warning - component \$1i1101 has unconnected pins: 0 input, 0 output, 1 ino
ut.
// warning - component \$1i1100 has unconnected pins: 0 input, 0 output, 1 ino
ut.
// warning - component \$1i1099 has unconnected pins: 0 input, 0 output, 1 ino
ut.
// warning - component \$1i1098 has unconnected pins: 0 input, 0 output, 1 ino
ut.
// warning - component \$1i1097 has unconnected pins: 0 input, 0 output, 1 ino
ut.
// warning - component \$1i1096 has unconnected pins: 0 input, 0 output, 1 ino
ut.
// warning - component \$1i1095 has unconnected pins: 0 input, 0 output, 1 ino
ut.
// warning - component \$1i1094 has unconnected pins: 0 input, 0 output, 1 ino
ut.
// warning - component \$1i1053 has unconnected pins: 0 input, 0 output, 1 ino
ut.
// warning - component \$1i1052 has unconnected pins: 0 input, 0 output, 1 ino
ut.
// warning - component \$1i1051 has unconnected pins: 0 input, 0 output, 1 ino
ut.
// warning - component \$1i1050 has unconnected pins: 0 input, 0 output, 1 ino
ut.
// warning - component \$1i1049 has unconnected pins: 0 input, 0 output, 1 ino
ut.
// warning - component \$1i1048 has unconnected pins: 0 input, 0 output, 1 ino
ut.
// warning - component \$1i1047 has unconnected pins: 0 input, 0 output, 1 ino
ut.
// warning - component \$1i1046 has unconnected pins: 0 input, 0 output, 1 ino
ut.
// warning - component \$1i1045 has unconnected pins: 0 input, 0 output, 1 ino
```

APPENDIX C-continued

```
ut.
// warning - component \$1i1044 has unconnected pins: 0 input, 0 output, 1 ino
ut.
// warning - component \$1i1043 has unconnected pins: 0 input, 0 output, 1 ino
ut.
// warning - component \$1i1042 has unconnected pins: 0 input, 0 output, 1 ino
ut.
// warning - component \$1i1041 has unconnected pins: 0 input, 0 output, 1 ino
ut.
// warning - component \$1i1040 has unconnected pins: 0 input, 0 output, 1 ino
ut.
// warning - component \$1i1039 has unconnected pins: 0 input, 0 output, 1 ino
ut.
// warning - component \$1i1038 has unconnected pins: 0 input, 0 output, 1 ino
ut.
// warning - component \$1i1037 has unconnected pins: 0 input, 0 output, 1 ino
ut.
// warning - component \$1i1036 has unconnected pins: 0 input, 0 output, 1 ino
ut.
// warning - component \$1i1035 has unconnected pins: 0 input, 0 output, 1 ino
ut.
// warning - component \$1i1034 has unconnected pins: 0 input, 0 output, 1 ino
ut.
// warning - component \$1i1033 has unconnected pins: 0 input, 0 output, 1 ino
ut.
// warning - component \$1i1032 has unconnected pins: 0 input, 0 output, 1 ino
ut.
// warning - component \$1i1031 has unconnected pins: 0 input, 0 output, 1 ino
ut.
// warning - component \$1i1030 has unconnected pins: 0 input, 0 output, 1 ino
ut.
// warning - component \$1i1029 has unconnected pins: 0 input, 0 output, 1 ino
ut.
// warning - component \$1i1028 has unconnected pins: 0 input, 0 output, 1 ino
ut.
// warning - component \$1i1027 has unconnected pins: 0 input, 0 output, 1 ino
ut.
// warning - component \$1i1026 has unconnected pins: 0 input, 0 output, 1 ino
ut.
// warning - component \$1i1025 has unconnected pins: 0 input, 0 output, 1 ino
ut.
// warning - component \$1i1024 has unconnected pins: 0 input, 0 output, 1 ino
ut.
// warning - component \$1i1023 has unconnected pins: 0 input, 0 output, 1 ino
ut.
// warning - component \$1i1022 has unconnected pins: 0 input, 0 output, 1 ino
ut.
// warning - component \$1i1021 has unconnected pins: 0 input, 0 output, 1 ino
ut.
endmodule // rpb_pbuf_ram
// design name:  spb_pbuf_ram
// options      : -n -i -e -t/tools/verilnet/translation_lib.t
//                -g/tools/verilnet/ -ospb_pbuf_ram.v
// levels       : level adap
module spb_pbuf_ram (di65, di64, di63, di62, di61, di60, di59, di58, di57,
    di56, di55, di54, di53, di52, di51, di50, di49, di48, di47, di46, di45,
    di44, di43, di42, di41, di40, di39, di38, di37, di36, di35, di34, di33,
    di32, di31, di30, di29, di28, di27, di26, di25, di24, di23, di22, di21,
    di20, di19, di18, di17, di16, di15, di14, di13, di12, di11, di10, di9,
    di8, di7, di6, di5, di4, di3, di2, di1, di0, we_h8, we_h7, we_h6, we_h5,
    we_h4, we_h3, we_h2, we_h1, we_h0, we_18, we_17, we_16, we_15, we_14,
    we_13, we_12, we_11, we_10, re8, re7, re6, re5, re4, re3, re2, re1, re0,
    do_h32, do_h31, do_h30, do_h29, do_h28, do_h27, do_h26, do_h25, do_h24,
    do_h23, do_h22, do_h21, do_h20, do_h19, do_h18, do_h17, do_h16, do_h15,
    do_h14, do_h13, do_h12, do_h11, do_h10, do_h9, do_h8, do_h7, do_h6,
    do_h5, do_h4, do_h3, do_h2, do_h1, do_h0, do_132, do_131, do_130, do_129,
    do_128, do_127, do_126, do_125, do_124, do_123, do_122, do_121, do_120,
    do_119, do_118, do_117, do_116, do_115, do_114, do_113, do_112, do_111,
    do_110, do_19, do_18, do_17, do_16, do_15, do_14, do_13, do_12, do_11,
    do_10, ra05, ra04, ra03, ra02, ra01, ra00, ra15, ra14, ra13, ra12,
    ra11, ra10, ra25, ra24, ra23, ra22, ra21, ra20, ra35, ra34, ra33, ra32,
    ra31, ra30, ra45, ra44, ra43, ra42, ra41, ra40, ra55, ra54, ra53, ra52,
    ra51, ra50, ra65, ra64, ra63, ra62, ra61, ra60, ra75, ra74, ra73, ra72,
    ra71, ra70, ra85, ra84, ra83, ra82, ra81, ra80);
  output do_h32, do_h31, do_h30, do_h29, do_h28, do_h27, do_h26, do_h25,
    do_h24, do_h23, do_h22, do_h21, do_h20, do_h19, do_h18, do_h17, do_h16,
    do_h15, do_h14, do_h13, do_h12, do_h11, do_h10, do_h9, do_h8, do_h7,
    do_h6, do_h5, do_h4, do_h3, do_h2, do_h1, do_h0, do_132, do_131, do_130,
    do_129, do_128, do_127, do_126, do_125, do_124, do_123, do_122, do_121,
```

APPENDIX C-continued

```
        do_120, do_119, do_118, do_117, do_116, do_115, do_114, do_113, do_112,
        do_111, do_110, do_19, do_18, do_17, do_16, do_15, do_14, do_13, do_12,
        do_11, do_10;
input di65, di64, di63, di62, di61, di60, di59, di58, di57, di56, di55,
        di54, di53, di52, di51, di50, di49, di48, di47, di46, di45, di44, di43,
        di42, di41, di40, di39, di38, di37, di36, di35, di34, di33, di32, di31,
        di30, di29, di28, di27, di26, di25, di24, di23, di22, di21, di20, di19,
        di18, di17, di16, di15, di14, di13, di12, di11, di10, di9, di8, di7, di6,
        di5, di4, di3, di2, di1, di0, we_h8, we_h7, we_h6, we_h5, we_h4, we_h3,
        we_h2, we_h1, we_h0, we_18, we_17, we_16, we_15, we_14, we_13, we_12,
        we_11, we_10, re8, re7, re6, re5, re4, re3, re2, re1, re0, ra05, ra04,
        ra03, ra02, ra01, ra00, ra15, ra14, ra13, ra12, ra11, ra10, ra25, ra24,
        ra23, ra22, ra21, ra20, ra35, ra34, ra33, ra32, ra31, ra30, ra45, ra44,
        ra43, ra42, ra41, ra40, ra55, ra54, ra53, ra52, ra51, ra50, ra65, ra64,
        ra63, ra62, ra61, ra60, ra75, ra74, ra73, ra72, ra71, ra70, ra85, ra84,
        ra83, ra82, ra81, ra80;
bushold \$1i1021 (.Z(do_h32));
bushold \$1i1022 (.Z(do_h31));
bushold \$1i1023 (.Z(do_h30));
bushold \$1i1024 (.Z(do_h29));
bushold \$1i1025 (.Z(do_h28));
bushold \$1i1026 (.Z(do_h27));
bushold \$1i1027 (.Z(do_h26));
bushold \$1i1028 (.Z(do_h25));
bushold \$1i1029 (.Z(do_h24));
bushold \$1i1030 (.Z(do_h23));
bushold \$1i1031 (.Z(do_h22));
bushold \$1i1032 (.Z(do_h21));
bushold \$1i1033 (.Z(do_h20));
bushold \$1i1034 (.Z(do_h19));
bushold \$1i1035 (.Z(do_h18));
bushold \$1i1036 (.Z(do_h17));
bushold \$1i1037 (.Z(do_h16));
bushold \$1i1038 (.Z(do_h15));
bushold \$1i1039 (.Z(do_h14));
bushold \$1i1040 (.Z(do_h13));
bushold \$1i1041 (.Z(do_h12));
bushold \$1i1042 (.Z(do_h11));
bushold \$1i1043 (.Z(do_h10));
bushold \$1i1044 (.Z(do_h9));
bushold \$1i1045 (.Z(do_h8));
bushold \$1i1046 (.Z(do_h7));
bushold \$1i1047 (.Z(do_h6));
bushold \$1i1048 (.Z(do_h5));
bushold \$1i1049 (.Z(do_h4));
bushold \$1i1050 (.Z(do_h3));
bushold \$1i1051 (.Z(do_h2));
bushold \$1i1052 (.Z(do_h1));
bushold \$1i1053 (.Z(do_h0));
bushold \$1i1094 (.Z(do_h132));
bushold \$1i1095 (.Z(do_h131));
bushold \$1i1096 (.Z(do_h130));
bushold \$1i1097 (.Z(do_h129));
bushold \$1i1098 (.Z(do_h128));
bushold \$1i1099 (.Z(do_h127));
bushold \$1i1100 (.Z(do_h126));
bushold \$1i1101 (.Z(do_h125));
bushold \$1i1102 (.Z(do_h124));
bushold \$1i1103 (.Z(do_h123));
bushold \$1i1104 (.Z(do_h122));
bushold \$1i1105 (.Z(do_h121));
bushold \$1i1106 (.Z(do_h120));
bushold \$1i1107 (.Z(do_h119));
bushold \$1i1108 (.Z(do_h118));
bushold \$1i1109 (.Z(do_h117));
bushold \$1i1110 (.Z(do_h116));
bushold \$1i1111 (.Z(do_h115));
bushold \$1i1112 (.Z(do_h114));
bushold \$1i1113 (.Z(do_h113));
bushold \$1i1114 (.Z(do_h112));
bushold \$1i1115 (.Z(do_h111));
bushold \$1i1116 (.Z(do_h110));
bushold \$1i1117 (.Z(do_h19));
bushold \$1i1118 (.Z(do_h18));
bushold \$1i1119 (.Z(do_h17));
bushold \$1i1120 (.Z(do_h16));
bushold \$1i1121 (.Z(do_h15));
bushold \$1i1122 (.Z(do_h14));
bushold \$1i1123 (.Z(do_h13));
```

APPENDIX C-continued

```
bushold \$1i1124 (.Z(do__h12));
bushold \$1i1125 (.Z(do__h11));
bushold \$1i1126 (.Z(do__h10));
rf64x66e2t urm3 (.DI65(di65), .DI64(di64), .DI63(di63), .DI62(di62), .DI61
    (di61), .DI60(di60), .DI59(di59), .DI58(di58), .DI57(di57), .DI56(di56)
    .DI55(di55), .DI54(di54), .DI53(di53), .DI52(di52), .DI51(di51), .DI50
    (di50), .DI49(di49), .DI48(di48), .DI47(di47), .DI46(di46), .DI45(di45)
    .DI44(di44), .DI43(di43), .DI42(di42), .DI41(di41), .DI40(di40), .DI39
    (di39), .DI38(di38), .DI37(di37), .DI36(di36), .DI35(di35), .DI34(di34),
    .DI33(di33), .DI32(di32), .DI31(di31), .DI30(di30), .DI29(di29), .DI28
    (di28), .DI27(di27), .DI26(di26), .DI25(di25), .DI24(di24), .DI23(di23),
    .DI22(di22), .DI21(di21), .DI20(di20), .DI19(di19), .DI18(di18), .DI17
    (di17), .DI16(di16), .DI15(di15), .DI14(di14), .DI13(di13), .DI12(di12),
    .DI11(di11), .DI10(di10), .DI9(di9), .DI8(di8), .DI7(di7), .DI6(di6),
    .DI5(di5), .DI4(di4), .DI3(di3), .DI2(di2), .DI1(di1), .DI0(di0), .WE1
    (we__h3), .WE0(we__13), .OE1(re3), .OE0(re3), .A5(ra35), .A4(ra34), .A3
    (ra33), .A2(ra32), .A1(ra31), .A0(ra30), .DO65(do__h32), .DO64(do__h31),
    .DO63(do__h30), .DO62(do__h29), .DO61(do__h28), .DO60(do__h27), .DO59
    (do__h26), .DO58(do__h25), .DO57(do__h24), .DO56(do__h23), .DO55(do__h22),
    .DO54(do__h21), .DO53(do__h20), .DO52(do__h19), .DO51(do__h18), .DO50
    (do__h17), .DO49(do__h16), .DO48(do__h15), .DO47(do__h14), .DO46(do__h13),
    .DO45(do__h12), .DO44(do__h11), .DO43(do__h10), .DO42(do__h9), .DO41(do__h8)
    .DO40(do__h7), .DO39(do__h6), .DO38(do__h5), .DO37(do__h4), .DO36(do__h3),
    .DO35(do__h2), .DO34(do__h1), .DO33(do__h0), .DO32(do__132), .DO31(do__131),
    .DO30(do__130), .DO29(do__129), .DO28(do__128), .DO27(do__127), .DO26
    (do__126), .DO25(do__125), .DO24(do__124), .DO23(do__123), .DO22(do__122),
    .DO21(do__121), .DO20(do__120), .DO19(do__119), .DO18(do__118), .DO17
    (do__117), .DO16(do__116), .DO15(do__115), .DO14(do__114), .DO13(do__113),
    .DO12(do__112), .DO11(do__111), .DO10(do__110), .DO9(do__19), .DO8(do__18),
    .DO7(do__17), .DO6(do__16), .DO5(do__15), .DO4(do__14), .DO3(do__13), .DO2
    (do__12), .DO1(do__11), .DO0(do__10));
rf64x66e2t urm2 (.DI65(di65), .DI64(di64), .DI63(di63), .DI62(di62), .DI61
    (di61), .DI60(di60), .DI59(di59), .DI58(di58), .DI57(di57) .DI56(di56),
    .DI55(di55), .DI54(di54), .DI53(di53), .DI52(di52), .DI51(di51), .DI50
    (di50), .DI49(di49), .DI48(di48), .DI47(di47), .DI46(di46), .DI45(di45),
    .DI44(di44), .DI43(di43), .DI42(di42), .DI4i(di41), .DI40(di40), .DI39
    (di39), .DI38(di38), .DI37(di37), .DI36(di36), .DI35(di35), .DI34(di34),
    .DI33(di33), .DI32(di32), .DI31(di31), .DI30(di30), .DI29(di29), .DI28
    (di28), .DI27(di27), .DI26(di26), .DI25(di25), .DI24(di24), .DI23(di23),
    .DI22(di22), .DI21(di21), .DI20(di20), .DI19(di19), .DI18(di18), .DI17
    (di17), .DI16(di16), .DI15(di15), .DI14(di14), .DI13(di13), .DI12(di12),
    .DI11(di11), .DI10(di10), .DI9(di9), .DI8(di8), .DI7(di7), .DI6(di6),
    .DI5(di5), .DI4(di4), .DI3(di3), .DI2(di2), .DI1(di1), .DI0(di0), .WE1
    (we__h2), .WE0(we__12), .OE1(re2), .OE0(re2), .A5(ra25), .A4(ra24), .A3
    (ra23), .A2(ra22), .A1(ra21), .A0(ra20), .DO65(do__h32), .DO64(do__h31),
    .DO63(do__h30), .DO62(do__h29), .DO61(do__h28), .DO60(do__h27), .DO59
    (do__h26), .DO58(do__h25), .DO57(do__h24), .DO56(do__h23), .DO55(do__h22),
    .DO54(do__h21), .DO53(do__h20), .DO52(do__h19), .DO51(do__h18), .DO50
    (do__h17), .DO49(do__h16), .DO48(do__h15), .DO47(do__h14), .DO46(do__h13),
    .DO45(do__h12), .DO44(do__h11), .DO43(do__h10), .DO42(do__h9), .DO41(do__h8),
    .DO40(do__h7), .DO39(do__h6), .DO38(do__h5), .DO37(do__h4), .DO36(do__h3),
    .DO35(do__h2), .DO34(do__h1), .DO33(do__h0), .DO32(do__132), .DO31(do__131),
    .DO30(do__130), .DO29(do__129), .DO28(do__128), .DO27(do__127), .DO26
    (do__126), .DO25(do__125), .DO24(do__124), .DO23(do__123), .DO22(do__122),
    .DO21(do__121), .DO20(do__120), .DO19(do__119), .DOi8(do__118), .DO17
    (do__117), .DO16(do__116), .DO15(do__115), .DO14(do__114), .DO13(do__113),
    .DO12(do__112), .DO11(do__111), .DO10(do__110), .DO9(do__19), .DO8(do__18),
    .DO7(do__17), .DO6(do__16), .DO5(do__15), .DO4(do__14), .DO3(do__13), .DO2
    (do__12), .DO1(do__11), .DO0(do__10));
rf64x66e2t urm1 (.DI65(di65), .DI64(di64), .DI63(di63), .DI62(di62), .DI61
    (di6i), .DI60(di60), .DI59(di59), .DI58(di58), .DI57(di57), .DI56(di56),
    .DI55(di55), .DI54(di54), .DI53(di53), .DI52(di52), .DI51(di51), .DI50
    (di50), .DI49(di49), .DI48(di48), .DI47(di47), .DI46(di46), .DI45(di45),
    .DI44(di44), .DI43(di43), .DI42(di42), .DI41(di41), .DI40(di40), .DI39
    (di39), .DI38(di38), .DI37(di37), .DI36(di36), .DI35(di35), .DI34(di34),
    .DI33(di33), .DI32(di32), .DI31(di31), .DI30(di30), .DI29(di29), .DI28
    (di28), .DI27(di27), .DI26(di26), .DI25(di25), .DI24(di24), .DI23(di23),
    .DI22(di22), .DI21(di21), .DI20(di20), .DI19(di19), .DI18(di18), .DI17
    (di17), .DI16(di16), .DI15(di15), .DI14(di14), .DI13(di13), .DI12(di12),
    .DI11(di11), .DI10(di10), .DI9(di9), .DI8(di8), .DI7(di7), .DI6(di6),
    .DI5(di5), .DI4(di4), .DI3(di3), .DI2(di2), .DI1(di1), .DI0(di0), .WE1
    (we__h1), .WE0(we__11), .OE1 (re1), .OE0(re1), .A5(ra15), .A4 (ra14), .A3
    (ra13), .A2(ra12), .A1(ra11), .A0(ra10), .DO65(do__h32), .DO64(do__h31),
    .DO63(do__h30), .DO62(do__h29), .DO61(do__h28), .DO60(do__h27), .DO59
    (do__h26), .DO58(do__h25), .DO57(do__h24), .DO56(do__h23), DO55(do__h22),
    .DO54(do__h21), .DO53(do__h20), .DO52(do__h19), .DO51(do__h18), .DO50
    (do__h17), .DO49(do__16), .DO48(do__15), .DO47(do__14), .DO46(do__h13),
    .DO45(do__h12), .DO44(do__h11), .DO43(do__h10), .DO42(do__h9), .DO41(do__h8),
    .DO40(do__h7), .DO39(do__h6), .DO38(do__h5), .DO37(do__h4), .DO36(do__h3),
```

APPENDIX C-continued

```
       .DO35(do_h2), .DO34(do_h1), .DO33(do_h0), .DO32(do_l32), .DO31(do_l31),
       .DO30(do_l30), .DO29(do_l29), .DO28(do_l28), .DO27(do_l27), .DO26
       (do_l26), .DO25(do_l25), .DO24(do_l24), .DO23(do_l23), .DO22(do_l22),
       .DO21(do_l21), .DO20(do_l20), .DO19(do_l19), .DO18(do_l18), .DO17
       (do_l17), .DO16(do_l16), .DO15(do_l15), .DO14(do_l14), .DO13(do_l13),
       .DO12(do_l12), .DO11(do_l11), .DO10(do_l10), .DO9(do_l9), .DO8(do_l8),
       .DO7(do_l7), .DO6(do_l6), .DO5(do_l5), .DO4(do_l4), .DO3(do_l3), .DO2
       (do_l2), .DO1(do_l1), .DO0(do_l0));
rf64x66e2t urm0 (.DI65(di65), .DI64(di64), .DI63(di63), .DI62(di62), .DI61
       (di61), .DI60(di60), .DI59(di59), .DI58(di58), .DI57(di57), .DI56(di56),
       .DI55(di55), .DI54(di54), .DI53(di53), .DI52(di52), .DI51(di51), .DI50
       (di50), .DI49(di49), .DI48(di48), .DI47(di47), .DI46(di46), .DI45(di45),
       .DI44(di44), .DI43(di43), .DI42(di42), .DI41(di41), .DI40(di40), .DI39
       (di39), .DI38(di38), .DI37(di37), .DI36(di36), .DI35(di35), .DI34(di34),
       .DI33(di33), .DI32(di32), .DI31(di31), .DI30(di30), .DI29(di29), .DI28
       (di28), .DI27(di27), .DI26(di26), .DI25(di25), .DI24(di24), .DI23(di23),
       .DI22(di22), .DI21(di21), .DI20(di20), .DI19(di19), .DI18(di18), .DI17
       (di17), .DI16(di16), .DI15(di15), .DI14(di14), .DI13(di13), .DI12(di12),
       .DI11(di11), .DI10(di10), .DI9(di9), .DI8(di8), .DI7(di7), .DI6(di6),
       .DI5(di5), .DI4(di4), .DI3(di3), .DI2(di2), .DI1(di1), .DI0(di0), .WE1
       (we_h0), .WE0(we_l0), .OE1(re0), .OE0(re0), .A5(ra05), .A4(ra04), .A3
       (ra03), .A2(ra02), .A1(ra01), .A0(ra00), .DO65(do_h32), .DO64(do_h31),
       .DO63(do_h30), .DO62(do_h29), .DO61(do_h28), .DO60(do_h27), .DO59
       (do_h26), .DO58(do_h25), .DO57(do_h24), .DO56(do_h23), .DO55(do_h22),
       .DO54(do_h21), .DO53(do_h20), .DO52(do_h19), .DO51(do_h18), .DO50
       (do_h17), .DO49(do_h16), .DO48(do_h15), .DO47(do_h14), .DO46(do_h13),
       .DO45(do_h12), .DO44(do_h11), .DO43(do_h10), .DO42(do_h9), .DO41(do_h8),
       .DO40(do_h7), .DO39(do_h6), .DO38(do_h5), .DO37(do_h4), .DO36(do_h3),
       .DO35(do_h2), .DO34(do_h1), .DO33(do_h0), .DO32(do_l32), .DO31(do_l31),
       .DO30(do_l30), .DO29(do_l29), .DO28(do_l28), .DO27(do_l27), .DO26
       (do_l26), .DO25(do_l25), .DO24(do_l24), .DO23(do_l23), .DO22(do_l22),
       .DO21(do_l21), .DO20(do_l20), .DO19(do_l19), .DO18(do_l18), .DO17
       (do_l17), .DO16(do_l16), .DO15(do_l15), .DO14(do_l14), .DO13(do_l13),
       .DO12(do_l12), .DO11(do_l11), .DO10(do_l10), .DO9(do_l9), .DO8(do_l8),
       .DO7(do_l7), .DO6(do_l6), .DO5(do_l5), .DO4(do_l4), .DO3(do_l3), .DO2
       (do_l2), .DO1(do_l1), .DO0(do_l0));
rf64x66e2t urm7 (.DI65(di65), .DI64(di64), .DI63(di63), .DI62(di62), .DI61
       (di61), .DI60(di60), .DI59(di59), .DI58(di58), .DI57(di57), .DI56(di56),
       .DI55(di55), .DI54(di54), .DI53(di53), .DI52(di52), .DI51(di51), .DI50
       (di50), .DI49(di49), .DI48(di48), .DI47(di47), .DI46(di46), .DI45(di45),
       .DI44(di44), .DI43(di43), .DI42(di42), .DI41(di41), .DI40(di40), .DI39
       (di39), .DI38(di38), .DI37(di37), .DI36(di36), .DI35(di35), .DI34(di34),
       .DI33(di33), .DI32(di32), .DI31(di31), .DI30(di30), .DI29(di29), .DI28
       (di28), .DI27(di27), .DI26(di26), .DI25(di25), .DI24(di24), .DI23(di23),
       .DI22(di22), .DI21(di21), .DI20(di20), .DI19(di19), .DI18(di18), .DI17
       (di17), .DI16(di16), .DI15(di15), .DI14(di14), .DI13(di13), .DI12(di12),
       .DI11(di11), .DI10(di10), .DI9(di9), .DI8(di8), .DI7(di7), .DI6(di6),
       .DI5(di5), .DI4(di4), .DI3(di3), .DI2(di2), .DI1(di1), .DI0(di0), .WE1
       (we_h7), .WE0(we_l7), .OE1(re7), .OE0(re7), .A5(ra75), .A4(ra74), .A3
       (ra73), .A2(ra72), .A1(ra71), .A0(ra70), .DO65(do_h32), .DO64(do_h31),
       .DO63(do_h30), .DO62(do_h29), .DO61(do_h28), .DO60(do_h27), .DO59
       (do_h26), .DO58(do_h25), .DO57(do_h24), .DO56(do_h23), .DO55(do_h22),
       .DO54(do_h21), .DO53(do_h20), .DO52(do_h19), .DO51(do_h18), .DO50
       (do_h17), .DO49(do_h16), DO48(do_h15), .DO47(do_h14), .DO46(do_h13),
       .DO45(do_h12), .DO44(do_h11), .DO43(do_h10), .DO42(do_h9), .DO41(do_h8),
       .DO40(do_h7), .DO39(do_h6), .DO38(do_h5), .DO37(do_h4), .DO36(do_h3),
       .DO35(do_h2), .DO34(do_h1), .DO33(do_h0), .DO32(do_l32), .DO31(do_l31),
       .DO30(do_l30), .DO29(do_l29), .DO28(do_l28), .DO27(do_l27), .DO26
       (do126), .DO25(do_l25), .DO24(do_l24), .DO23(do_l23), .DO22(do_l22),
       .DO21(do_l21), .DO20(do_l20), .DO19(do_l19), .DO18(do_l18), .DO17
       (do_l17), .DO16(do_l16), .DO15(do_l15), .DO14(do_l14), .DO13(do_l13),
       .DO12(do_l12), .DO11(do_l11), .DO10(do_l10), .DO9(do_l9), .DO8(do_l8),
       .DO7(do_l7), .DO6(do_l6), .DO5(do_l5), .DO4(do_l4), .DO3(do_l3), .DO2
       (do_l2), .DO1(do_l1), .DO0(do_l0));
rf64x66e2t urm8 (.DI65(di65), .DI64(di64), .DI63(di63), .DI62(di62), .DI61
       (di61), .DI60(di60), .DI59(di59), .DI58(di58), .DI57(di57), .DI56(di56),
       .DI55(di55), .DI54(di54), .DI53(di53), .DI52(di52), .DI51(di51), .DI50
       (di50), .DI49(di49), .DI48(di48), .DI47(di47), .DI46(di46), .DI45(di45),
       .DI44(di44), .DI43(di43), .DI42(di42), .DI41(di41), .DI40(di40), .DI39
       (di39), .DI38(di38), .DI37(di37), .DI36(di36), .DI35(di35), .DI34(di34),
       .DI33(di33), .DI32(di32), .DI31(di31), .DI30(di30), .DI29(di29), .DI28
       (di28), .DI27(di27), .DI26(di26), .DI25(di25), .DI24(di24), .DI23(di23),
       .DI22(di22), .DI21(di21), .DI20(di20), .DI19(di19), .DI18(di18), .DI17
       (di17), .DI16(di16), .DI15(di15), .DI14(di14), .DI13(di13), .DI12(di12),
       .DI11(di11), .DI10(di10), .DI9(di9), .DI8(di8), .DI7(di7), .DI6(di6),
       .DI5(di5), .DI4(di4), .DI3(di3), .DI2(di2), .DI1(di1), .DI0(di0), .WE1
       (we_h8), .WE0(we_l8), .OE1(re8), .OE0(re8), .A5(ra85), .A4(ra84), .A3
       (ra83), .A2(ra82), .A1(ra81), .A0(ra80), .DO65(do_h32), .DO64(do_h31),
       .DO63(do_h30), .DO62(do_h29), .DO61(do_h28), .DO60(do_h27), .DO59
```

APPENDIX C-continued (do_h26), .DO58(do_h25), .DO57(do_h24), .DO56(do_h23), .DO55(do_h22),
.DO54(do_h21), .DO53(do_h20), .DO52(do_h19), .DO51(do_h18), .DO50
(do_h17), .DO49(do_h16), .DO48(do_h15), .DO47(do_h14), .DO46(do_h13),
.DO45(do_h12), .DO44(do_h11), .DO43(do_h10), .DO42(do_h9), .DO41(do_h8),
.DO40(do_h7), .DO39(do_h6), .DO38(do_h5), .DO37(do_h4), .DO36(do_h3),
.DO35(do_h2), .DO34(do_h1), .DO33(do_h0), .DO32(do_l32), .DO31(do_l31),
.DO30(do_l30), .DO29(do_l29), .DO28(do_l28), .DO27(do_l27), .DO26
(do_l26), .DO25(do_l25), .DO24(do_l24), .DO23(do_l23), .DO22(do_l22),
.DO21(do_l21), .DO20(do_l20), .DO19(do_l19), .DO18(do_l18), .DO17
(do_l17), .DO16(do_l16), .DO15(do_l15), .DO14(do_l14), .DO13(do_l13),
.DO12(do_l12), .DO11(do_l11), .DO10(do_l10), .DO9(do_l9), .DO8(do_l8),
.DO7(do_l7), .DO6(do_l6), .DO5(do_l5), .DO4(do_l4), .DO3(do_l3), .DO2
(do_l2), .DO1(do_l1), .DO0(do_l0));
rf64x66e2t urm5 (.DI65(di65), .DI64(di64), .DI63(di63), .DI62(di62), .DI61
(di61), .DI60(di60), .DI59(di59), .DI58(di58), .DI57(di57), .DI56(di56),
.DI55(di55), .DI54(di54), .DI53(di53), .DI52(di52), .DI51(di51), .DI50
(di50), .DI49(di49), .DI48(di48), .DI47(di47), .DI46(di46), .DI45(di45),
.DI44(di44), .DI43(di43), .DI42(di42), .DI41(di41), .DI40(di40), .DI39
(di39), .DI38(di38), .DI37(di37), .DI36(di36), .DI35(di35), .DI34(di34),
.DI33(di33), .DI32(di32), .DI31(di31), .DI30(di30), .DI29(di29), .DI28
(di28), .DI27(di27), .DI26(di26), .DI25(di25), .DI24(di24), .DI23(di23),
.DI22(di22), .DI21(di21), .DI20(di20), .DI19(di19), .DI18(di18), .DI17
(di17), .DI16(di16), .DI15(di15), .DI14(di14), .DI13(di13), .DI12(di12),
.DI11(di11), .DI10(di10), .DI9(di9), DI8(di8), .DI7(di7), .DI6(di6),
.DI5(di5), .DI4(di4), .DI3(di3), .DI2(di2), .DI1(di1), .DI0(di0), .WE1
(we_h5), .WE0(we_l5), .OE1(re5), .OE0(re5), .A5(ra55), .A4(ra54), .A3
(ra53), .A2(ra52), .A1(ra51), .A0(ra50), .DO65(do_h32), .DO64(do_h31),
.DO63(do_h30), .DO62 (do_h29), .DO61(do_h28), .DO60(do_h27), .DO59
(do_h26), .DO58(do_h25), .DO57(do_h24), .DO56(do_h23), .DO55(do_h22),
.DO54(do_h21), .DO53 (do_h20), .DO52(do_h19), .DO51(do_h18), .DO50
(do_h17), .DO49(do_h16), .DO48(do_h15), .DO47(do_h14), .DO46(do_h13),
.DO45(do_h12), .DO44(do_h11), .DO43(do_h10), .DO42(do_h9), .DO41(do_h8),
.DO40(do_h7), .DO39(do_h6), .DO38(do_h5), .DO37(do_h4), .DO36(do_h3),
.DO35(do_h2), .DO34(do_h1), .DO33(do_h0), .DO32(do_l32), .DO31(do_l31),
.DO30(do_l30), .DO29(do_l29), .DO28(do_l28), .DO27(do_l27), .DO26
(do_l26), .DO25(do_l25), .DO24(do_l24), .DO23(do_l23), .DO22(do_l22),
.DO21(do_l21), .DO20(do_l20), .DO19(do_l19), .DO18(do_l18), .DO17
(do_l17), .DO16(do_l16), .DO15(do_l15), .DO14(do_l14), .DO13(do_l13),
.DO12(do_l12), .DO11(do_l11), .DO10(do_l10), .DO9(do_l9), .DO8(do_l8),
.DO7(do_l7), .DO6(do_l6), .DO5(do_l5), .DO4(do_l4), .DO3(do_l3), .DO2
(do_l2), .DO1(do_l1), .DO0(do_l0));
rf64x66e2t urm6 (.DI65(di65), .DI64(di64), .DI63(di63), .DI62(di62), .DI61
(di61), .DI60(di60), .DI59(di59), .DI58(di58), .DI57(di57), .DI56(di56),
.DI55(di55), .DI54(di54), .DI53(di53), .DI52(di52), .DI51(di51), .DI50
(di50), .DI49(di49), .DI48(di48), .DI47(di47), .DI46(di46), .DI45(di45),
.DI44(di44), .DI43(di43), .DI42(di42), .DI41(di41), .DI40(di40), .DI39
(di39), .DI38(di38), .DI37(di37), .DI36(di36), .DI35(di35), .DI34(di34),
.DI33(di33), .DI32(di32), .DI31(di31), .DI30(di30), .DI29(di29), .DI28
(di28), .DI27(di27), .DI26(di26), .DI25(di25), .DI24(di24), .DI23(di23),
.DI22(di22), .DI21(di21), .DI20(di20), .DI19(di19), .DI18(di18), .DI17
(di17), DI16(di16), .DI15(di15), .DI14(di14), .DI13(di13), .DI12(di12),
.DI11(di11), .DI10(di10), .DI9(di9), .DI8(di8), .DI7(di7), .DI6(di6),
.DI5(di5), .DI4(di4), .DI3(di3), .DI2(di2), .DI1(di1), .DI0(di0), .WE1
(we_h6), .WE0(we_l6), .OE1(re6), .OE0(re6), .A5(ra65), .A4(ra64), .A3
(ra63), .A2(ra62), .A1(ra61), .A0(ra60), .DO65(do_h32), .DO64(do_h31),
.DO63(do_h30), .DO62(do_h29), .DO61(do_h28), .DO60(do_h27), .DO59
(do_h26), .DO58(do_h25), .DO57(do_h24), .DO56(do_h23), .DO55(do_h22),
.DO54(do_h21), .DO53(do_h20), .DO52(do_h19), .DO51(do_h18), .DO50
(do_h17), .DO43(do_h16), .DO48(do_h15), .DO47(do_h14), .DO46(do_h13),
.DO45(do_h12), .DO44(do_h11), .DO43(do_h10), .DO42(do_h9), .DO41(do_h8),
.DO40(do_h7), .DO39(do_h6), .DO38(do_h5), .DO37(do_h4), .DO36(do_h3),
.DO35(do_h2), .DO34(do_h1), .DO33(do_h0), .DO32(do_l32), .DO31(do_l31),
.DO30(do_l30), .DO29(do_l29), .DO28(do_l28), .DO27(do_l27), .DO26
(do_l26), .DO25(do_l25), .DO24(do_l24), .DO23(do_l23), .DO22(do_l22),
.DO21(do_l21), .DO20(do_l20), .DO19(do_l19), .DO18(do_l18), .DO17
(do_l17), .DO16(do_l16), .DO15(do_l15), .DO14(do_l14), .DO13(do_l13),
.DO12(do_l12), .DO11(do_l11), .DO10(do_l10), .DO9(do_l9), .DO8(do_l8),
.DO7(do_l7), .DO6(do_l6), .DO5(do_l5), .DO4(do_l4), .DO3(do_l3), .DO2
(do_l2), .DO1(do_l1), .DO0(do_l0));
rf64x66e2t urm4 (.DI65(di65), .DI64(di64), .DI63(di63), .DI62(di62), .DI61
(di61), .DI60(di60), .DI59(di59), .DI58(di58), .DI57(di57), .DI56(di56),
.DI55(di55), .DI54(di54), .DI53(di53), .DI52(di52), .DI51(di51), .DI50
(di50), .DI49(di49), .DI48(di48), .DI47(di47), .DI46(di46), .DI45(di45),
.DI44(di44), .DI43(di43), .DI42(di42), .DI41(di41), .DI40(di40), .DI39
(di39), .DI38(di38), .DI37(di37), .DI36(di36), .DI35(di35), .DI34(di34),
.DI33(di33), .DI32(di32), .DI31(di31), .DI30(di30), .DI29(di29), .DI28
(di28), .DI27(di27), .DI26(di26), .DI25(di25), .DI24(di24), .DI23(di23),
.DI22(di22), .DI21(di21), .DI20(di20), .DI19(di19), .DI18(di18), .DI17
(di17), .DI16(di16), .DI15(di15), .DI14(di14), .DI13(di13), .DI12(di12),

APPENDIX C-continued

```
    .DI11(di11), .DI10(di10), .DI9(di9), .DI8(di8), .DI7(di7), .DI6(di6),
    .DI5(di5), .DI4(di4), .DI3(di3), .DI2(di2), .DI1(di1), .DI0(di0), .WE1
    (we_h4), .WE0(we_14), .OE1(re4), .OE0(re4), .A5(ra45), .A4(ra44), .A3
    (ra43), .A2(ra42), .A1(ra41), .A0(ra40), .DO65(do_h32), .DO64(do_h31),
    .DO63(do_h30), .DO62(do_h29), .DO61(do_h28), .DO60(do_h27), .DO59
    (do_h26), .DO58(do_h25), .DO57(do_h24), .DO56(do_h23), .DO55(do_h22),
    .DO54(do_h21), .DO53(do_h20), .DO52(do_h19), .DO51(do_h18), .DO50
    (do_h17), .DO49(do_h16), .DO48(do_h15), .DO47(do_h14), .DO46(do_h13),
    .DO45(do_h12), .DO44(do_h11), .DO43(do_h10), .DO42(do_h9), .DO41(do_h8),
    .DO40(do_h7), .DO39(do_h6), .DO38(do_h5), .DO37(do_h4), .DO36(do_h3),
    .DO35(do_h2), .DO34(do_h1), .DO33(do_h0), .DO32(do_132), .DO31(do_131),
    .DO30(do_130), .DO29(do_129), .DO28(do_128), .DO27(do_127), .DO26
    (do_126), .DO25(do_125), .DO24(do_124), .DO23(do_123), .DO22(do_122),
    .DO21(do_121), .DO20(do_120), .DO19(do_119), .DO18(do_118), .DO17
    (do_117), .DO16(do_116), .DO15(do_115), .DO14(do_114), .DO13(do_113),
    .DO12(do_112), .DO11(do_111), .DO10(do_110), .DO9(do_19), .DO8(do_18),
    .DO7(do_17), .DO6(do_16), .DO5(do_15), .DO4(do_14), .DO3(do_13), .DO2
    (do_12), .DO1(do_11), .DO0(do_10));
// warning - component \$1i1126 has unconnected pins: 0 input, 0 output, 1 inout.
// warning - component \$1i1125 has unconnected pins: 0 input, 0 output, 1 inout.
// warning - component \$1i1124 has unconnected pins: 0 input, 0 output, 1 inout.
// warning - component \$1i1123 has unconnected pins: 0 input, 0 output, 1 inout.
// warning - component \$1i1122 has unconnected pins: 0 input, 0 output, 1 inout.
// warning - component \$1i1121 has unconnected pins: 0 input, 0 output, 1 inout.
// warning - component \$1i1120 has unconnected pins: 0 input, 0 output, 1 inout.
// warning - component \$1i1119 has unconnected pins: 0 input, 0 output, 1 inout.
// warning - component \$1i1118 has unconnected pins: 0 input, 0 output, 1 inout.
// warning - component \$1i1117 has unconnected pins: 0 input, 0 output, 1 inout.
// warning - component \$1i1116 has unconnected pins: 0 input, 0 output, 1 inout.
// warning - component \$1i1115 has unconnected pins: 0 input, 0 output, 1 inout.
// warning - component \$1i1114 has unconnected pins: 0 input, 0 output, 1 inout.
// warning - component \$1i1113 has unconnected pins: 0 input, 0 output, 1 inout.
// warning - component \$1i1112 has unconnected pins: 0 input, 0 output, 1 inout.
// warning - component \$1i1111 has unconnected pins: 0 input, 0 output, 1 inout.
// warning - component \$1i1110 has unconnected pins: 0 input, 0 output, 1 inout.
// warning - component \$1i1109 has unconnected pins: 0 input, 0 output, 1 inout.
// warning - component \$1i1108 has unconnected pins: 0 input, 0 output, 1 inout.
// warning - component \$1i1107 has unconnected pins: 0 input, 0 output, 1 inout.
// warning - component \$1i1106 has unconnected pins: 0 input, 0 output, 1 inout.
// warning - component \$1i1105 has unconnected pins: 0 input, 0 output, 1 inout.
// warning - component \$1i1104 has unconnected pins: 0 input, 0 output, 1 inout.
// warning - component \$1i1103 has unconnected pins: 0 input, 0 output, 1 inout.
// warning - component \$1i1102 has unconnected pins: 0 input, 0 output, 1 inout.
// warning - component \$1i1101 has unconnected pins: 0 input, 0 output, 1 inout.
// warning - component \$1i1100 has unconnected pins: 0 input, 0 output, 1 inout.
// warning - component \$1i1099 has unconnected pins: 0 input, 0 output, 1 inout.
// warning - component \$1i1098 has unconnected pins: 0 input, 0 output, 1 inout.
// warning - component \$1i1097 has unconnected pins: 0 input, 0 output, 1 inout.
// warning - component \$1i1096 has unconnected pins: 0 input, 0 output, 1 ino
```

APPENDIX C-continued

```
ut.
// warning - component \$1i1095 has unconnected pins: 0 input, 0 output, 1 inout.
// warning - component \$1i1094 has unconnected pins: 0 input, 0 output, 1 inout.
// warning - component \$1i1053 has unconnected pins: 0 input, 0 output, 1 inout.
// warning - component \$1i1052 has unconnected pins: 0 input, 0 output, 1 inout.
// warning - component \$1i1051 has unconnected pins: 0 input, 0 output, 1 inout.
// warning - component \$1i1050 has unconnected pins: 0 input, 0 output, 1 inout.
// warning - component \$1i1049 has unconnected pins: 0 input, 0 output, 1 inout.
// warning - component \$1i1048 has unconnected pins: 0 input, 0 output, 1 inout.
// warning - component \$1i1047 has unconnected pins: 0 input, 0 output, 1 inout.
// warning - component \$1i1046 has unconnected pins: 0 input, 0 output, 1 inout.
// warning - component \$1i1045 has unconnected pins: 0 input, 0 output, 1 inout.
// warning - component \$1i1044 has unconnected pins: 0 input, 0 output, 1 inout.
// warning - component \$1i1043 has unconnected pins: 0 input, 0 output, 1 inout.
// warning - component \$1i1042 has unconnected pins: 0 input, 0 output, 1 inout.
// warning - component \$1i1041 has unconnected pins: 0 input, 0 output, 1 inout.
// warning - component \$1i1040 has unconnected pins: 0 input, 0 output, 1 inout.
// warning - component \$1i1039 has unconnected pins: 0 input, 0 output, 1 inout.
// warning - component \$1i1038 has unconnected pins: 0 input, 0 output, 1 inout.
// warning - component \$1i1037 has unconnected pins: 0 input, 0 output, 1 inout.
// warning - component \$1i1036 has unconnected pins: 0 input, 0 output, 1 inout.
// warning - component \$1i1035 has unconnected pins: 0 input, 0 output, 1 inout.
// warning - component \$1i1034 has unconnected pins: 0 input, 0 output, 1 inout.
// warning - component \$1i1033 has unconnected pins: 0 input, 0 output, 1 inout.
// warning - component \$1i1032 has unconnected pins: 0 input, 0 output, 1 inout.
// warning - component \$1i1031 has unconnected pins: 0 input, 0 output, 1 inout.
// warning - component \$1i1030 has unconnected pins: 0 input, 0 output, 1 inout.
// warning - component \$1i1029 has unconnected pins: 0 input, 0 output, 1 inout.
// warning - component \$1i1028 has unconnected pins: 0 input, 0 output, 1 inout.
// warning - component \$1i1027 has unconnected pins: 0 input, 0 output, 1 inout.
// warning - component \$1i1026 has unconnected pins: 0 input, 0 output, 1 inout.
// warning - component \$1i1025 has unconnected pins: 0 input, 0 output, 1 inout.
// warning - component \$1i1024 has unconnected pins: 0 input, 0 output, 1 inout.
// warning - component \$1i1023 has unconnected pins: 0 input, 0 output, 1 inout.
// warning - component \$1i1022 has unconnected pins: 0 input, 0 output, 1 inout.
// warning - component \$1i1021 has unconnected pins: 0 input, 0 output, 1 inout.
endmodule // spb_pbuf_ram
```

What is claimed is:

1. An adapter for transferring data between a peripheral bus coupled to a peripheral device and a computer bus coupled to a system memory inside a personal computer, the adapter circuit comprising:

a data transfer module coupled to the peripheral bus; and a host interface module coupled to the computer bus, the host interface module being also coupled to the data transfer module for transfer of the data between the peripheral bus and the computer bus, the host interface module including:

an address register for holding an address signal indicative of a location in the system memory;

a count register for holding a count signal indicative of the amount of data to be transferred from the system memory;

a restart memory, to recover from an interrupt, connected to the address register and the count register, having a plurality of groups of storage elements, each group of storage elements including an address storage element and a count storage element; wherein:

the host interface module stores a value of an address in the address register, and stores a value of a count in the count register when storing data from the location in system memory, the value in the address register and the value in the count register changing during receipt of data; and the host interface module copies the values from the address register into the address storage element of a selected one of the groups, and from the count register into the count storage element in the selected group always at the beginning of the transfer of data, the values being used to identify data to be transferred from a processor.

2. The adapter of claim 1 wherein:

the data transfer module includes a storage circuit having a data bus and a control bus, each of the data bus and the control bus being coupled to the host interface module, the storage circuit including a plurality of pages for holding data received from the data bus prior to transmission on the peripheral bus; and the storage circuit drives a first control signal active on the control bus when storing data into a first storage element in one of the pages; and the host interface module includes a write pointer register and a read pointer register, values in each of the pointer registers indicating one of the groups in the memory; and the host interface module uses a value in the write pointer register to identify the group to be used in copying the address and the count in response to the first control signal becoming active, and increments the value in the write pointer register to a new value.

3. The adapter of claim 2 wherein:

the host interface module increments the value in the write pointer register only if the new value in the write pointer register is different from the value in the read pointer register.

4. The adapter of claim 2 wherein:

the storage circuit drives a second control signal active on the control bus when all data in the page is successfully transmitted on the peripheral bus; and the host interface module increments the value in the read pointer register in response to the second control signal becoming active.

5. The adapter of claim 2 wherein:

the storage circuit drives a third control signal active on the control bus when reset; and the host interface module initializes each of the write pointer register and the read pointer register to a common value in response to the third control signal becoming active.

6. The adapter of claim 2 wherein:

the host interface module stores in said memory the value of said count signal and the value of said address signal each time said first control signal goes active.

7. The adapter of claim 1 wherein:

the host interface module stores the value of the address signal in a second address register included in the host interface module; and the host interface module stores the value of the count signal in a second count register also included in the host interface module, the second address register and the second count register being connected to the address register and the count register, the host interface module using the value in the second address register to identify the location in system memory for the data transfer and the value in the second count register to identify the amount of the data to be transferred from the location, the values in the second address register and the second count register changing during the data transfer in a manner different from the corresponding values in the address register and the count register.

8. The adapter of claim 7 wherein:

the host interface module includes a third register for holding a third address signal indicative of a second location in the system memory containing the first address signal;

each of the groups includes a third address storage element; and the host interface module copies the value from the third address register into the third address storage element of the group at the beginning of the transfer of data.

9. A method for transferring data between two buses, the method comprising:

copying the value from a register into a restart memory, to recover from an interrupt, always at the beginning of the transfer of data;

transferring data between a first bus and a second bus;

temporarily storing the data during transfer;

flushing data that is being temporarily stored in response to interruption of data transfer; and copying the value back from restart memory into the register, to refetch the flushed data.

10. The method of claim 9 further comprising:

updating the value based on receipt of a line of data;

checking if a portion of the value indicative of a count is zero; and returning to updating if the portion is not zero.

* * * * *

UNITED STATES PATENT AND TRADEMARK OFFICE
CERTIFICATE OF CORRECTION

PATENT NO.   : 6,298,403 B1
DATED        : October 2, 2001
INVENTOR(S)  : Suri et al.

It is certified that error appears in the above-identified patent and that said Letters Patent is hereby corrected as shown below:

Column 2,
Line 26, please delete "avail able" and insert -- available --;

Column 8,
Line 53, please delete "$A \geq I \geq N$" and insert -- $A \leq I \leq N$ --;

Column 15,
Line 62, Appendix C continued after "DI56(di23)" please insert -- , --.

Signed and Sealed this

Eighteenth Day of March, 2003

JAMES E. ROGAN
*Director of the United States Patent and Trademark Office*